(12) United States Patent
Masuhara et al.

(10) Patent No.: US 8,540,904 B2
(45) Date of Patent: Sep. 24, 2013

(54) COMPOSITION FOR ULTRAVIOLET ABSORBENT SUBSTANCE AND ULTRAVIOLET ABSORBENT SUBSTANCE COMPRISING SAME

(75) Inventors: Yusaku Masuhara, Hyogo (JP); Hidehiko Myoken, Hyogo (JP); Katsumasa Yamamoto, Hyogo (JP)

(73) Assignee: Sumitomo Seika Chemicals Co., Ltd., Kako, Hyogo (JP)

( * ) Notice: Subject to any disclaimer, the term of this patent is extended or adjusted under 35 U.S.C. 154(b) by 0 days.

(21) Appl. No.: 13/522,790

(22) PCT Filed: Dec. 10, 2010

(86) PCT No.: PCT/JP2010/072208
§ 371 (c)(1),
(2), (4) Date: Aug. 27, 2012

(87) PCT Pub. No.: WO2011/089794
PCT Pub. Date: Jul. 28, 2011

(65) Prior Publication Data
US 2012/0313058 A1    Dec. 13, 2012

(30) Foreign Application Priority Data

Jan. 19, 2010  (JP) ................ 2010-008874
Apr. 2, 2010  (JP) ................ 2010-086082

(51) Int. Cl.
| F21V 9/04 | (2006.01) |
| F21V 9/06 | (2006.01) |
| G02B 5/22 | (2006.01) |
| G02B 5/26 | (2006.01) |
| C08K 5/00 | (2006.01) |
| C08K 5/45 | (2006.01) |

(52) U.S. Cl.
USPC ......... 252/589; 252/588; 359/288; 359/359; 524/83; 524/84

(58) Field of Classification Search
USPC ........... 106/287.16; 252/589, 588; 428/447; 359/288, 359; 524/83, 84
See application file for complete search history.

(56) References Cited

U.S. PATENT DOCUMENTS

| 2007/0184232 A1* | 8/2007 | Takahashi et al. ........ 428/64.4 |
| 2009/0011256 A1 | 1/2009 | Ito et al. |
| 2011/0057155 A1 | 3/2011 | Furuwaka et al. |

FOREIGN PATENT DOCUMENTS

| JP | 10-279936 A | 10/1998 |
| JP | 2957924 B2 | 10/1999 |
| JP | 2000-008033 | * 1/2000 |
| JP | 2000-063647 A | 2/2000 |
| JP | 2005-074852 | * 3/2005 |
| JP | 2006-335704 A | 12/2006 |
| JP | 2008-174607 A | 7/2008 |
| JP | 2009-035703 A | 2/2009 |
| JP | 2009-270062 A | 11/2009 |
| WO | WO 2005/068459 | * 7/2005 |

OTHER PUBLICATIONS

International Search Report of PCT/JP2010/072208, mailing date Jan. 25, 2011.
Written Opinion of PCT/JP2010/072208, mailing date Jan. 25, 2011.
Notification of Transmittal of Translation of the International Preliminary Report on Patentability (Forms PCT/IB/326) of International Application No. PCT/JP2010/072208 mailed Aug. 16, 2012 with Forms PCT/IB/373, PCT/IB/338 and PCT/ISA/237.

* cited by examiner

*Primary Examiner* — Bijan Ahvazi
(74) *Attorney, Agent, or Firm* — Westerman, Hattori, Daniels & Adrian, LLP

(57) ABSTRACT

An ultraviolet absorbent substance includes a metal complex and a matrix, formed with at least one matrix material and/or polymerizable monomer as a precursor of a matrix material and containing said metal complex therein. One exemplary function of the ultraviolet absorbent substance is allowing visible light rays transmitted through satisfactorily while selectively blocking ultraviolet rays.

18 Claims, No Drawings

COMPOSITION FOR ULTRAVIOLET ABSORBENT SUBSTANCE AND ULTRAVIOLET ABSORBENT SUBSTANCE COMPRISING SAME

TECHNICAL FIELD

The present invention relates to a composition for an ultraviolet absorbent substance which comprises at least one metal complex represented by formula (1) and at least one matrix material and/or polymerizable monomer as a precursor of a matrix material, and an ultraviolet absorbent substance comprising the composition.

BACKGROUND ART

In recent years, substances having a function of transmitting visible light rays satisfactorily while selectively blocking ultraviolet rays have been used in various fields. For example, in window glasses of automobiles, window glasses of buildings and the like, ultraviolet blocking glasses are widely used for blocking ultraviolet rays which cause sunburns and degradation of interior materials.

Molded products of transparent thermoplastic resins such as an acryl resin, a polycarbonate resin, a polyester resin and the like, to which a function of blocking ultraviolet rays is imparted, are also used in applications such as transparent resin plates used in car ports, show windows, show cases, transparent shades for illumination and the like and various kinds of transparent containers.

Thus, a method of using inorganic metal oxide fine particles or an organic ultraviolet absorbent as an ultraviolet absorbent is generally known for imparting to substrates such as glass, resins and the like a function of blocking ultraviolet rays.

However, for ultraviolet absorbents which have been known, irrespective of inorganic metal oxide fine particles or organic ultraviolet absorbents, ultraviolet rays which can be blocked are limited to those having a wavelength of 380 nm or less, and there are very little known ultraviolet absorbents which can satisfactorily block ultraviolet rays called UV-A of 380 to 400 nm, are not degraded even if irradiated with light for a long period, and transmit visible light satisfactorily.

Herein, UV-A refers to ultraviolet rays having a relatively long wavelength (320 to 400 nm), and is the most abundant of ultraviolet rays of sunlight which reach the ground, but is known to cause pigmentation (freckles) and wrinkles through long time exposure because it penetrates deep into the skin for the human body.

REFERENCE DOCUMENTS

Patent Documents

Patent Document 1: JP 2008-174607 A
Patent Document 2: JP 2000-63647 A
Patent Document 3: JP 2957924 B1
Patent Document 4: JP 2009-35703 A

SUMMARY OF THE INVENTION

Problems to be Solved by the Invention

The present invention is to solve the aforementioned problems involved in the prior art, and its object is to provide a composition for an ultraviolet absorbent substance, which can keep excellent light resistance for a long period and can satisfactorily block UV-A which has been difficult to block heretofore while maintaining the transmittance of visible light at a high level; and an ultraviolet absorbent substance comprising the composition.

Means for Solving the Problems

The present invention relates to a composition for an ultraviolet absorbent substance as shown below, and an ultraviolet absorbent substance comprising the composition.

Item 1. A composition for an ultraviolet absorbent substance which comprises at least one metal complex represented by formula (1) and at least one matrix material and/or polymerizable monomer as a precursor of a matrix material:

[Chemcial Formula 1]

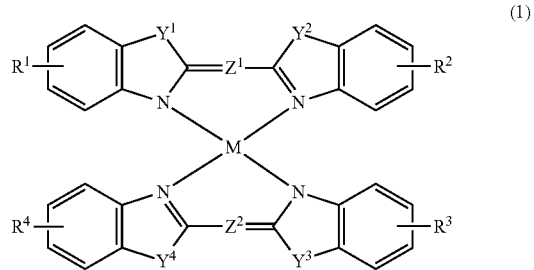

(1)

wherein $Y^1$, $Y^2$, $Y^3$ and $Y^4$ are each, independently of one another, NH, $NR^5$, an oxygen atom or a sulfur atom, and $R^5$ of $NR^5$ assigned to $Y^1$, $Y^2$, $Y^3$ or $Y^4$ is an alkyl group having 1 to 8 carbon atoms or an aryl group having 6 to 15 carbon atoms, which may have substituent(s), provided that when at least two of $Y^1$, $Y^2$, $Y^3$ and $Y^4$ are represented by $NR^5$, these occurrences of $R^5$ of $NR^5$ each represent a substituent which is independent of one another;

$Z^1$ and $Z^2$ are each, independently of one another, a nitrogen atom, CH or $CR^6$, $R^6$ of $CR^6$ assigned to $Z^1$ or $Z^2$ represents an alkyl group having 1 to 8 carbon atoms, which may have substituent(s), an aryl group having 6 to 15 carbon atoms, which may have substituent(s), a heteroaryl group having 4 to 12 carbon atoms, which may have substituent(s), a heteroaralkyl group having 5 to 12 carbon atoms, which may have substituent(s), or an aralkyl group having 7 to 15 carbon atoms, provided that when $Z^1$ and $Z^2$ are both represented by $CR^6$, these occurrences of $R^6$ of $CR^6$ each represent a substituent which is independent of each other; and each of $R^1$, $R^2$, $R^3$ and $R^4$ is absent or, if present, one to four of 4 hydrogen atoms bound to 4 carbon atoms other than 2 carbon atoms shared with a five-membered ring among 6 carbon atoms of one benzene ring can be substituted, and all of substituents substituting for hydrogen atom(s) of the four benzene rings are each, independently of one another, an alkyl group having 1 to 8 carbon atoms, which may have substituent(s), a hydroxyl group, a carboxyl group, an alkoxy group having 1 to 4 carbon atoms, a halogeno group, an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s), and M represents a metal atom.

Item 2. The composition for an ultraviolet absorbent substance according to item 1, wherein the metal atom M in formula (1) is one of a cobalt atom, a nickel atom, a copper atom and a zinc atom.

Item 3. The composition for an ultraviolet absorbent substance according to one of items 1 and 2, which is in a solution form wherein a solvent is included, or no solvent is included and the precursor of a matrix material also serves as a solvent.

Item 4. The composition for an ultraviolet absorbent substance according to one of items 1 and 2, which is in a dispersion liquid form wherein a dispersion medium is included, or no dispersion medium is included and the precursor of a matrix material also serves as a dispersion medium, and fine particles of the metal complex are dispersed.

Item 5. An ultraviolet absorbent substance which is prepared using the composition for an ultraviolet absorbent substance according to any of items 1 to 4.

Item 6. The ultraviolet absorbent substance according to item 5, which is an ultraviolet absorbent substance as a laminate having on a substrate a film of a matrix material containing the metal complex.

Item 7. The ultraviolet absorbent substance according to item 5, which is an ultraviolet absorbent substance in a thin film form wherein the metal complex is contained in a film of a matrix material.

The present invention provides a composition for an ultraviolet absorbent substance which includes a metal complex represented by formula (1) as an ultraviolet absorbent, and at least one matrix material and/or polymerizable monomer as a precursor of a matrix material.

The composition for an ultraviolet absorbent substance in the present invention may be a type in which the metal complex represented by formula (1) is in a dissolved state, or may be a type in which fine particles of the metal complex represented by formula (1) are in a dispersed state.

The composition for an ultraviolet absorbent substance including the metal complex represented by formula (1), which is in a dissolved state, is particularly advantageous for maintaining at a high level the visible light transmittance of an ultraviolet absorbent substance finally obtained, while the composition for an ultraviolet absorbent substance including fine particles of the metal complex represented by formula (1), which are in a dispersed state, is particularly advantageous for obtaining an ultraviolet absorbent substance having excellent light resistance.

Also, the present invention provides an ultraviolet absorbent substance as a laminate which is obtained by forming a coating film on a glass substrate and a resin substrate using the composition for an ultraviolet absorbent substance, and an ultraviolet absorbent substance in a thin film form which is obtained by coating the composition on a releasable substrate, and then separating the same.

The metal complex represented by formula (1) efficiently blocks UV-A which has been difficult to block heretofore, exhibits light resistance much better than that of a general organic ultraviolet absorbent, and hardly suffers reduction of its ultraviolet ray absorbing capability even if irradiated with light continuously for a long period. Also, it is the noteworthy feature that since the metal complex has an ultraviolet ray blocking capability much better than that of metal oxide fine particles, a satisfactory ultraviolet ray blocking capability can be imparted by addition in a small amount, and further transparency in a visible light region is quite excellent.

Effects of the Invention

According to the present invention, there can be provided a composition for an ultraviolet absorbent substance, which can keep excellent light resistance for a long period and can satisfactorily block UV-A which has been difficult to block heretofore while maintaining the transmittance of visible light at a high level; and an ultraviolet absorbent substance comprising the composition.

MODE FOR CARRYING OUT THE INVENTION

Hereinbelow, the present invention will be described in detail.

The present invention provides a composition for an ultraviolet absorbent substance which comprises at least one metal complex represented by formula (1) and at least one matrix material and/or polymerizable monomer as a precursor of a matrix material:

[Chemcial Formula 2]

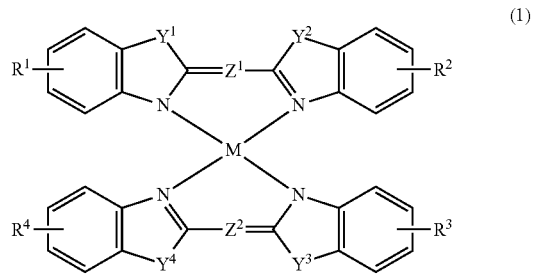

(1)

wherein $Y^1$, $Y^2$, $Y^3$ and $Y^4$ are each, independently of one another, NH, $NR^5$, an oxygen atom or a sulfur atom, and $R^5$ of $NR^5$ assigned to $Y^1$, $Y^2$, $Y^3$ or $Y^4$ is an alkyl group having 1 to 8 carbon atoms or an aryl group having 6 to 15 carbon atoms, which may have substituent(s), provided that when at least two of $Y^1$, $Y^2$, $Y^3$ and $Y^4$ are represented by $NR^5$, these occurrences of $R^5$ of $NR^5$ each represent a substituent which is independent of one another. $Z^1$ and $Z^2$ are each, independently of one another, a nitrogen atom, CH or $CR^6$, $R^6$ of $CR^6$ assigned to $Z^1$ or $Z^2$ represents an alkyl group having 1 to 8 carbon atoms, which may have substituent(s), an aryl group having 6 to 15 carbon atoms, which may have substituent(s), a heteroaryl group having 4 to 12 carbon atoms, which may have substituent(s), a heteroaralkyl group having 5 to 12 carbon atoms, which may have substituent(s), or an aralkyl group having 7 to 15 carbon atoms. It is to be noted that when $Z^1$ and $Z^2$ are both represented by $CR^6$, these occurrences of $R^6$ of $CR^6$ each represent a substituent which is independent of each other. Each of $R^1$, $R^2$, $R^3$ and $R^4$ is absent or, if present, one to four of 4 hydrogen atoms bound to 4 carbon atoms other than 2 carbon atoms shared with a five-membered ring among 6 carbon atoms of one benzene ring can be substituted, and all of substituents substituting for hydrogen atom(s) of the four benzene rings are each, independently of one another, an alkyl group having 1 to 8 carbon atoms, which may have substituent(s), a hydroxyl group, a carboxyl group, an alkoxy group having 1 to 4 carbon atoms, a halogeno group, an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s), and M represents a metal atom.

$Y^1$, $Y^2$, $Y^3$ and $Y^4$, $Z^1$ and $Z^2$, $R^1$, $R^2$, $R^3$, $R^4$, $R^5$, $R^6$ and M in formula (1) are illustrated below.

Examples of the $R^5$ of $NR^5$ assigned to $Y^1$, $Y^2$, $Y^3$ or $Y^4$ in the formula include alkyl groups such as a methyl group, an ethyl group, an n-propyl group, an isopropyl group, an n-butyl group, a sec-butyl group, a tert-butyl group, an n-pentyl group, an isopentyl group, a neopentyl group, a cyclopentyl group, an n-hexyl group, an isohexyl group, a cyclohexyl group, an n-heptyl group, an n-octyl group and the like, and aryl groups such as a phenyl group, a 2-methylphenyl group, a 3-methylphenyl group, a 4-methylphenyl group, a 3-chlorophenyl group, a 4-bromophenyl group, a 3,4-dichlorophenyl group, a naphthyl group and the like.

In addition, when at least two of $Y^1$, $Y^2$, $Y^3$ and $Y^4$ are represented by $NR^5$, these occurrences of $R^5$ of $NR^5$ each represent a substituent which is independent of one another.

Herein, $Y^1$, $Y^2$, $Y^3$ and $Y^4$ in formula (1) are especially preferably sulfur atoms from the viewpoint of simplicity of a synthesis method.

Examples of the $R^6$ of $CR^6$ assigned to $Z^1$ or $Z^2$ in the formula include alkyl groups such as a methyl group, an ethyl group, an n-propyl group, an isopropyl group, an n-butyl group, a sec-butyl group, a tert-butyl group, an n-pentyl group, an isopentyl group, a neopentyl group, a cyclopentyl group, an n-hexyl group, an isohexyl group, a cyclohexyl group, an n-heptyl group, an n-octyl group and the like, aryl groups such as a phenyl group, a 2-methylphenyl group, a 3-methylphenyl group, a 4-methylphenyl group, a 3-chlorophenyl group, a 4-bromophenyl group, a 3,4-dichlorophenyl group, a naphthyl group and the like, heteroaryl groups such as a 2-furyl group, a 2-thienyl group, a 5-chloro-2-thienyl group, a 2-pyrrolyl group, a 2-oxazolyl group, a 5-methyl-2-oxazolyl group, a 2-thiazolyl group and the like, and heteroaralkyl groups such as a 4-pyridylmethyl group, a 4-quinolylmethyl group, a 2-thienylmethyl group and the like, and aralkyl groups such as a 4-acetamidobenzyl group, a 3-aminobenzyl group, a 4-aminobenzyl group, a 3-methoxybenzyl group, a 2-methoxyphenethyl group, a 4-(n-pentyloxy)benzyl group, a 2-allyloxyphenethyl group, a 5-allyl-2-hydroxy-3-methoxybenzyl group, a 4-phenylbenzyl group, a 2-bromobenzyl group, a 3-phenethyl group, a 4-bromobenzyl group, a 2-chlorobenzyl group, a 3-chlorobenzyl group, a 4-chlorobenzyl group, a 6-bromo-2-hydroxybenzyl group, a 5-bromo-3-nitro-2-hydroxyphenethyl group, a 4-(n-butyl)benzyl group, a 3-bromo-5-methoxy-4-hydroxybenzyl group, a 4-benzyloxybenzyl group, a 6-bromo-3-methoxy-2-hydroxybenzyl group, a (1-bromo-2-naphthyl)-n-propyl group, a 2-benzyloxybenzyl group, a 3,5-bistrifluoromethylphenethyl group, a 4-tert-butylbenzyl group, a 5-bromo-2-fluorobenzyl group, a 3-bromo-4-methoxybenzyl group, a 5-bromo-2-methoxybenzyl group, a 3-bromo-5-chloro-2-hydroxybenzyl group, a 4-bromo-2-fluorobenzyl group, a 2-bromo-4,5-dimethoxyphenethyl group, a 3,4-ethylenedioxybenzyl group, a 3-bromo-4-fluorophenethyl group, a 6-bromo-3,4-methylenedioxybenzyl group, a 3-bromo-4-hydroxybenzyl group, a 2-bromo-5-fluorophenethyl group, a 4-cyanobenzyl group, a 4-trifluorobenzyl group, a 4-(4-chlorophenoxy)phenethyl group, a 4-(N,N-diethylamino)benzyl group, a 3,4-diacetoxybenzyl group, a 4-(N,N-diphenylamino)benzyl group, a 4-[N-(4,4-dioxothiomorpholino)]benzyl group, a 4-(N-pyrrolidino)benzyl group, a 3-(2-hydroxyethoxy)benzyl group, a 4-(2-hydroxyethoxy)phenethyl group, a 4-hydroxy-3,5-dimethylbenzyl group, a (6-hydroxy-2-naphthyl)-n-propyl group, a 4-isopropylbenzyl group, a 4-isobutylbenzyl group and the like.

Among those illustrated as the $R^6$ of $CR^6$ assigned to $Z^1$ or $Z^2$, especially preferable are aralkyl groups from the viewpoint of simplicity of a synthesis method and reactivity.

In addition, when $Z^1$ and $Z^2$ are both represented by $CR^6$, these occurrences of $R^6$ of $CR^6$ each represent a substituent which is independent of each other.

Further, $Z^1$ and $Z^2$ in formula (1) are especially preferably nitrogen atoms from the viewpoint of simplicity of a synthesis method.

Examples of the alkyl group assigned to $R^1$, $R^2$, $R^3$ or $R^4$ and having 1 to 8 carbon atoms, which may have substituent(s), in the formula, include a methyl group, an ethyl group, a 2-methoxyethyl group, an n-propyl group, an isopropyl group, a 3-chloro-n-propyl group, an n-butyl group, a sec-butyl group, a tert-butyl group, a 4-hydroxy-n-butyl group, an n-pentyl group, an isopentyl group, a neopentyl group, a cyclopentyl group, an n-hexyl group, an isohexyl group, cyclohexyl, a 6-phenyl-n-hexyl group, an n-heptyl group and an n-octyl group.

Examples of the alkoxy group assigned to $R^1$, $R^2$, $R^3$ or $R^4$ and having 1 to 4 carbon atoms, in the formula, include a methoxy group, an ethoxy group, and a tert-butoxy group.

Examples of the halogeno group assigned to $R^1$, $R^2$, $R^3$ or $R^4$, in the formula, include a fluoro group, a chloro group, a bromo group and an iode group.

Examples of the alkylaminosulfonyl group assigned to $R^1$, $R^2$, $R^3$ or $R^4$ and having 1 to 8 carbon atoms, which may have substituent(s), in the formula, include an N-methylaminosulfonyl group, an N-ethylaminosulfonyl group, an N-isopropylaminosulfonyl group, an N-n-propylaminosulfonyl group, an N-n-butylaminosulfonyl group, an N,N-dimethylaminosulfonyl group, an N,N,-methylethylaminosulfonyl group, an N,N-diethylaminosulfonyl group, an N,N-ethylisopropylaminosulfonyl group, an N,N-diisopropylaminosulfonyl group, an N,N-di-n-propylaminosulfonyl group, an N,N-di-n-butylaminosulfonyl group and an N,N-diisobutylaminosulfonyl group.

Examples of the morpholinosulfonyl group assigned to $R^1$, $R^2$, $R^3$ or $R^4$, which may have substituent(s), in the formula, include a morpholinosulfonyl group, a 2-methylmorpholinosulfonyl group, a 3-methylmorpholinosulfonyl group, a 2-ethylmorpholinosulfonyl group, a 3-n-propylmorpholinosulfonyl group, a 3-n-butylmorpholinosulfonyl group, a 2,3-dimethylmorpholinosulfonyl group, a 2,6-dimethylmorpholinosulfonyl group and a 3-phenylmorpholinosulfonyl group.

Examples of the piperidinosulfonyl group assigned to $R^1$, $R^2$, $R^3$ or $R^4$, which may have substituent(s), in the formula, include a piperidinosulfonyl group, a 2-methylpiperidinosulfonyl group, a 3-methylpiperidinosulfonyl group, a 4-methylpiperidinosulfonyl group, a 2-ethylpiperidinosulfonyl group, a 4-n-propylpiperidinosulfonyl group, a 3-n-butylpiperidinosulfonyl group, a 2,4-dimethylpiperidinosulfonyl group, a 2,6-dimethylpiperidinosulfonyl group and a 4-phenylpiperidinosulfonyl group.

Examples of the pyrrolidinosulfonyl group assigned to $R^1$, $R^2$, $R^3$ or $R^4$, which may have substituent(s), in the formula, include a pyrrolidinosulfonyl group, a 2-methylpyrrolidinosulfonyl group, a 3-methylpyrrolidinosulfonyl group, a 2-ethylpyrrolidinosulfonyl group, a 3-n-propylpyrrolidinosulfonyl group, 3-n-butylpyrrolidinosulfonyl group, a 2,4-dimethylpyrrolidinosulfonyl group, a 2,5-dimethylpyrrolidinosulfonyl group and a 3-phenylpyrrolidinosulfonyl group.

Examples of the thiomorpholinosulfonyl group assigned to $R^1$, $R^2$, $R^3$ or $R^4$, which may have substituent(s), in the formula, include a thiomorpholinosulfonyl group, a 2-methylthiomorpholinosulfonyl group, a 3-methylthiomorpholinosulfonyl group, a 2-ethylthiomorpholinosulfonyl group, a 3-n-propylthiomorpholinosulfonyl group, a 3-n-butylthiomorpholinosulfonyl group, a 2,3-dimethylthiomorpholinosulfonyl group, a 2,6-dimethylthiomorpholinosulfonyl group and a 3-phenylthiomorpholinosulfonyl group.

Examples of the piperazinosulfonyl group assigned to $R^1$, $R^2$, $R^3$ or $R^4$, which may have substituent(s), in the formula, include a piperazinosulfonyl group, a 2-methylpiperazinosulfonyl group, a 3-methylpiperazinosulfonyl group, a 2-ethylpiperazinosulfonyl group, a 3-n-propylpiperazinosulfonyl group, a 3-n-butylpiperazinosulfonyl group, a 2,5-dimethylpiperazinosulfonyl group, a 2,6-dimethylpiperazinosulfonyl group, a 3-phenylpiperazinosulfonyl group and a 2-pyrimidylpiperazinosulfonyl group.

Each of the $R^1$, $R^2$, $R^3$ and $R^4$ is absent or, if present, one to four, preferably one or two of 4 hydrogen atoms bound to 4 carbon atoms other than 2 carbon atoms shared with a five-membered ring among 6 carbon atoms of one benzene ring can be substituted, and all of substituents substituting for hydrogen atom(s) of the four benzene rings are each, independently of one another, an alkyl group having 1 to 8 carbon atoms, which may have substituent(s), a hydroxyl group, a carboxyl group, an alkoxy group having 1 to 4 carbon atoms, a halogeno group, an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s), and preferably absent, or an alkyl group having 1 to 8 carbon atoms, which may have substituent(s), a halogeno group or an alkoxy group having 1 to 4 carbon atoms, more preferably absent, or a halogeno group or an alkoxy group having 1 to 4 carbon atoms, further preferably absent, from the viewpoint of economy, i.e. availability of raw materials and yields.

It is especially advantageous from the viewpoint of solubility in a solvent that each of the $R^1$, $R^2$, $R^3$ and $R^4$ is an alkylaminosulfonyl group having 1 to 8 carbon atoms, a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s), particularly an alkylaminosulfonyl group having 1 to 8 carbon atoms, which may have substituent(s), or a morpholinosulfonyl group which may have substituent(s).

$Y^1$, $Y^2$, $Y^3$ and $Y^4$, $Z^1$ and $Z^2$, and $R^1$, $R^2$, $R^3$ and $R^4$ are each independent of one another, but from the viewpoint of simplicity of a synthesis method and quality (purity) control of the metal complex obtained, preferable is $Y^1=Y^2$ and $Y^3=Y^4$ and $Z^1=Z^2$ and $R^1=R^2=R^3=R^4$. From the viewpoint of solubility of the metal complex in various kinds of solvents, preferable is $Y^1=Y^3\neq Y^2=Y^4$ and $Z^1=Z^2$ and $R^1=R^3=R^2=R^4$, or $Y^1=Y^3=Y^2=Y^4$ and $Z^1=Z^2$ and $R^1=R^3\neq R^2=R^4$.

Examples of the metal atoms represented by M in the formula include a cobalt atom, a nickel atom, a copper atom and a zinc atom.

The metal complex represented by formula (1) can be synthesized by reacting a ligand represented by the following formula (2) with a metal salt such as a metal halide, a metal sulfate, a metal acetate, a metal nitrate or the like.

Formula (2):

[Chemcial Formula 3]

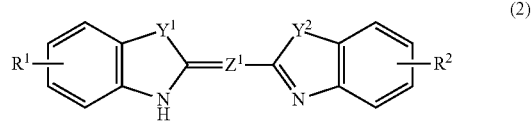

(2)

In formula (2), $Y^1$, $Y^2$, $Z^1$, $R^1$ and $R^2$ correspond, respectively, to $Y^1$ (and/or $Y^3$), $Y^2$ (and/or $Y^4$), $Z^1$ (and/or $Z^2$), $R^1$ (and/or $R^3$) and $R^2$ (and/or $R^4$) in formula (1).

The ligand represented by formula (2) can be synthesized by, for example, the method disclosed in "JP 56-87575 A", "Synthesis 1987, 368", "Synthesis 1982, 590", "Synthesis 1982, 1066-1067", "J. Org. Chem. 2002, 67, 5753-5772", "J. Org. Chem. 2002, 67, 5753-5772", "J. Org. Chem. 1961, 26, 3434-3445", "Gazz. Chim. Ital. 1996, 126, 329-337", "Gazz. Chim. Ital. 1994, 124, 301-308" and "JP 2007-535421 T".

Hereinbelow, some of methods for producing the ligand represented by formula (2) will be described.

<<Method for Producing a Ligand>> i) Formula (3): $Y^1=Y^2=S$ and $Z^1=N$ in formula (2)

[Chemcial Formula 4]

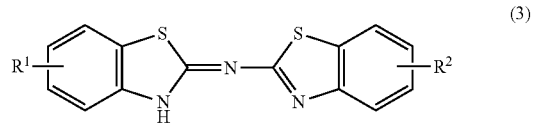

(3)

For example, the ligand can be synthesized in accordance with the method described in JP 56-87575 A. That is, 2,2'-iminobisbenzothiazole or 2,2'-iminobis(substituted benzothiazole) can be synthesized by reacting 2-aminobenzothiazole (where $R^1$ and $R^2$ are absent) or 2-amino-substituted benzothiazole (where $R^1$ and $R^2$ are an alkyl group having 1 to 8 carbon atoms, which may have substituent(s), a hydroxyl group, a carboxyl group, an alkoxy group having 1 to 4 carbon atoms or a halogeno group) by heating to 150 to 185° C. in the presence of an acid catalyst such as phenol and the like.

ii) Formula (4): $Y^1=S$, $Y^2=O$ and $Z^1=N$ in formula (2)

[Chemcial Formula 5]

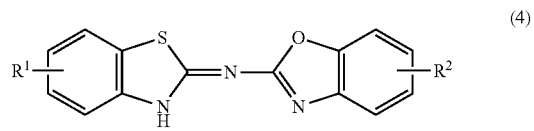

(4)

For example, the ligand can be synthesized in accordance with the method described in Synthesis 1987, 368. That is, 2-(2-benzothiazolylamino)benzoxazole or 2-[2-(substituted benzothiazolyl)amino]substituted benzoxazole can be synthesized by dissolving 2-aminophenol (where $R^2$ is absent) or 2-amino-substituted phenol (where $R^2$ is an alkyl group having 1 to 8 carbon atoms, which may have substituent(s), a hydroxyl group, a carboxyl group, an alkoxy group having 1 to 4 carbon atoms or a halogeno group) in N,N-dimethylformamide (DMF), adding an aqueous sodium hydroxide solution as a base, stirring the resulting mixture at room temperature for 30 minutes, adding dropwise thereto a DMF solution of S,S'-dimethyl-N-(2-benzothiazolyl)-carbonimidodithioate (where $R^1$ is absent) or S,S'-dimethyl-N-[2-(substituted benzothiazolyl)]-carbonimidodithioate (where $R^1$ is an alkyl group having 1 to 8 carbon atoms, which may have substituent(s), a hydroxyl group, a carboxyl group, an alkoxy group having 1 to 4 carbon atoms or a halogeno group) and refluxing the resulting mixture under a nitrogen atmosphere.

The S,S'-dimethyl-N-(2-benzothiazolyl)carbonimidodithioate or S,S'-dimethyl-N-[2-(substituted benzothiazolyl)]carbonimidodithioate can be synthesized in accordance with, for example, the method described in Synthesis 1982, 590.

That is, S,S'-dimethyl-N-(2-benzothiazolyl)carbonimidodithioate (where $R^1$ is absent) or S,S'-dimethyl-N-(2-substituted benzothiazolyl)carbonimidodithioate (where $R^1$ is an alkyl group having 1 to 8 carbon atoms, which may have substituent(s), a hydroxyl group, a carboxyl group, an alkoxy group having 1 to 4 carbon atoms or a halogeno group) can be synthesized by dissolving 2-aminobenzothiazole (where $R^1$ is absent) or 2-amino-substituted benzothiazole (where $R^1$ is an alkyl group having 1 to 8 carbon atoms, which may have substituent(s), a hydroxyl group, a carboxyl group, an alkoxy group having 1 to 4 carbon atoms or a halogeno group) in DMF, adding dropwise to the solution an aqueous sodium hydroxide solution under a water or an ice bath, then adding dropwise carbon disulfide, further adding dropwise an aqueous sodium hydroxide solution and then adding dropwise methyl iodide.

iii) Formula (5): $Y^1$=S, $Y^2$=NH and $Z^1$=N in formula (2)

[Chemcial Formula 6]

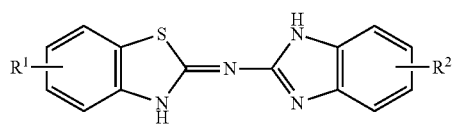

(5)

For example, the ligand can be synthesized in accordance with the method described in Synthesis 1982, 1066-1067. That is, 2-(2-benzothiazolylamino)benzoimidazole or 2-[2-(substituted benzothiazolylamino)]substituted benzoimidazole can be synthesized by dissolving o-phenylenediamine (where $R^2$ is absent) or o-(substituted phenylene)diamine (where $R^2$ is an alkyl group having 1 to 8 carbon atoms, which may have substituent(s), a hydroxyl group, a carboxyl group, an alkoxy group having 1 to 4 carbon atoms or a halogeno group) in DMF, adding dropwise thereto a DMF solution of S,S'-dimethyl-N-(2-benzothiazolyl)-carbonimidodithioate (where $R^1$ is absent) or S,S'-dimethyl-N-[2-(substituted benzothiazolyl]-carbonimidodithioate (where $R^1$ is an alkyl group having 1 to 8 carbon atoms, which may have substituent(s), a hydroxyl group, a carboxyl group, an alkoxy group having 1 to 4 carbon atoms or a halogeno group), and then refluxing the resulting mixture for 10 to 16 hours.

iv) Formula (6): $Y^1$=S, $Y^2$=NH and $Z^1$=CH in formula (2)

[Chemcial Formula 7]

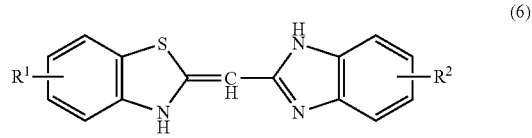

(6)

For example, the ligand can be synthesized in accordance with the method described in J. Org. Chem. 2002, 67, 5753-5772. That is, (2-benzothiazolyl) (2-benzimidazolyl)methane or [2-(substituted benzothiazolyl)][2-(substituted benzimidazolyl)]methane can be synthesized by refluxing o-phenylenediamine (where $R^2$ is absent) or o-(substituted phenylene)diamine (where $R^2$ is an alkyl group having 1 to 8 carbon atoms, which may have substituent(s), a hydroxyl group, a carboxyl group, an alkoxy group having 1 to 4 carbon atoms or a halogeno group) and ethyl-2-benzothiazolyl acetate (where $R^1$ is absent) or ethyl-2-(substituted benzothiazolyl)acetate (where $R^1$ is an alkyl group having 1 to 8 carbon atoms, which may have substituent(s), a hydroxyl group, a carboxyl group, an alkoxy group having 1 to 4 carbon atoms or a halogeno group) under a nitrogen atmosphere at 160° C. for 6 hours.

The ethyl-2-benzothiazolyl acetate or ethyl-2-(substituted benzothiazolyl)acetate can be synthesized in accordance with, for example, the method described in J. Org. Chem. 2002, 67, 5753-5772.

That is, ethyl-2-benzothiazolyl acetate or ethyl-2-(substituted benzothiazolyl)acetate can be synthesized by mixing ethylcyano acetate and 2-amino-substituted thiophenol and reacting the resulting mixture under a nitrogen atmosphere at 120° C. for 2 hours.

v) Formula (7): $Y^1$=$Y^2$=O, $Z^1$=CH in formula (2)

[Chemcial Formula 8]

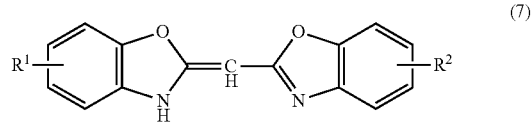

(7)

For example, the ligand can be synthesized in accordance with the method described in U.S. Pat. No. 3,250,780. That is, 2-aminophenol (where $R^1$ and $R^2$ are absent) or 2-amino-substituted phenol (where $R^1$ and $R^2$ are an alkyl group having 1 to 8 carbon atoms, which may have substituent(s), a hydroxyl group, a carboxyl group, an alkoxy group having 1 to 4 carbon atoms or a halogeno group) and malonic acid are mixed, and the mixed liquid is added in polyphosphoric acid under stirring while being kept at 70° C. Next, the reaction liquid is heated to 175° C. to be reacted, whereby bis(2-benzoxazolyl)methane or bis[2-(substituted benzoxazolyl)]methane can be synthesized.

vi) Formula (8): $Y^1=Y^2=S$, $Z^1=CH$ in formula (2)

[Chemcial Formula 9]

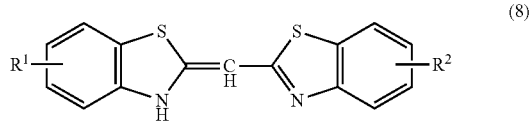

(8)

For example, the ligand can be synthesized in accordance with the method described in J. Org. Chem. 1961, 26, 3434-3445. That is, 2-aminothiophenol (where $R^1$ and $R^2$ are absent) or 2-amino-substituted thiophenol (where $R^1$ and $R^2$ are an alkyl group having 1 to 8 carbon atoms, which may have substituent(s), a hydroxyl group, a carboxyl group, an alkoxy group having 1 to 4 carbon atoms or a halogeno group) and malonic acid are mixed, and the mixed liquid is added in polyphosphoric acid under stirring while being kept at 70° C. Next, the reaction liquid is reacted at 125 to 150° C. for 2 hours, whereby bis(2-benzothiazolyl)methane or bis[2-(substituted benzothiazolyl)]methane can be synthesized.

vii) Formula (9): $Y^1=NR^5$, $Y^2=NR^5$, $Z^1=CH$ in formula (2)

[Chemcial Formula 10]

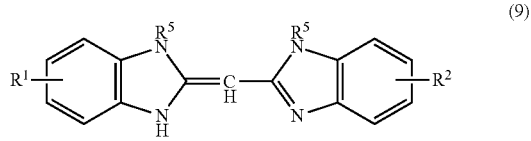

(9)

For example, the ligand can be synthesized in accordance with the method described in Gazz. Chim. Ital. 1996, 126, 329-337. That is, bis[2-(N-substituted)benzimidazolyl]methane or bis[2-(N-substituted) (substituted benzimidazolyl)]methane can be synthesized by mixing (N-substituted-)o-phenylenediamine (where $R^1$ and $R^2$ are absent) or (N-substituted-) [o-(substituted phenylene)]diamine (where $R^1$ and $R^2$ are an alkyl group having 1 to 8 carbon atoms, which may have substituent(s), a hydroxyl group, a carboxyl group, an alkoxy group having 1 to 4 carbon atoms or a halogeno group) and diethyl malonate, and refluxing the mixed liquid under a nitrogen atmosphere at 155° C. for 11 hours.

viii) Formula (10): $Z^1=CR^6$ in formula (2)

[Chemcial Formula 11]

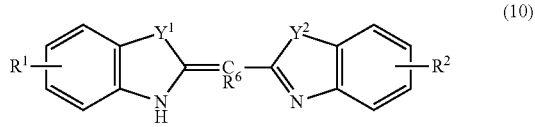

(10)

For example, the ligand can be synthesized in accordance with the method described in Gazz. Chim. Ital. 1994, 124, 301-308. As described above, $R^6$ of $CR^6$ assigned to $Z^1$ or $Z^2$ in formula (1) is especially preferably an aralkyl group. Hereinbelow, a synthesis method will be described with the aralkyl group being a 4-pyridylmethyl group in this case. Even in the case of a substituent other than the 4-pyridylmethyl group, the ligand can be synthesized in accordance with the same synthesis method by selecting a corresponding base (an aldehyde corresponding to the substituent).

By mixing (2-benzothiazolyl)(2-benzimidazolyl)methane or [2-(substituted benzothiazolyl)][2-(substituted benzimidazolyl)]methane obtained in iv), or bis(2-benzoxazolyl)methane or bis[2-(substituted benzoxazolyl)]methane obtained in v), or bis(2-benzothiazolyl)methane or bis[2-(substituted benzothiazolyl)]methane obtained in vi), or bis[2-(N-substituted)benzimidazolyl]methane or bis[2-(N-substituted) (substituted benzimidazolyl)]methane obtained in vii) with acetic acid and sodium acetate, reacting the resulting mixture by adding thereto 4-pyridinecarboxaldehyde, and then reducing the reaction product with palladium on carbon, Corresponding 4-[β,β-(2-benzothiazolyl) (2-benzimidazolyl)ethyl]pyridine or 4-[β,β-{2-(substituted benzothiazolyl)}{2-(substituted benzimidazolyl)}ethyl]pyridine can be synthesized from the compound obtained in iv), corresponding 4-[β,β-bis(2-benzoxazolyl)ethyl]pyridine or 4-[β,β-bis{2-(substituted benzoxazolyl)}ethyl]pyridine can be synthesized from the compound obtained in v), corresponding 4-[β,β-bis(2-benzothiazolyl)ethyl]pyridine or 4-[β,β-bis{2-(substituted benzothiazolyl)}ethyl]pyridine can be synthesized from the compound obtained in vi), or corresponding 4-[β,β-bis{2-(N-substituted) benzimidazolyl}ethyl]pyridine or 4-[β,β-bis{2-(N-substituted) (substituted benzoxazolyl)ethyl]pyridine can be synthesized from the compound obtained in vii).

ix) At least one substituent of each of $R^1$ and $R^2$ is an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s) in formula (2)

For example, into the ligand obtained by the method in i) to viii) (each of $R^1$ and $R^2$ is absent, or if present, is limited to one in which one to three of 4 hydrogen atoms bound to 4 carbon atoms other than 2 carbon atoms shared with a five-membered ring among 6 carbon atoms of one benzene ring are substituted in formula (2)) an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s) in accordance with the method described in JP 2007-535421 T.

Hereinbelow, a synthesis method will be described using as an example 2, 2'-iminobisbenzothiazole or 2,2'-iminobis (substituted benzothiazole) obtained in i) in this case.

2,2'-iminobisbenzothiazole or 2,2'-iminobis (substituted benzothiazole) obtained in i) is added to chlorosulfonic acid, and the mixture is stirred overnight. Further, thionyl chloride is added, and the resulting mixture is stirred at 50° C. for an hour and then cooled to room temperature. The mixture is poured onto ice, subjected to suction filtration and stirred with primary or secondary amine together with remaining ice, whereby 2,2'-iminobis(substituted benzothiazole) can be synthesized.

<<Method for Producing the Metal Complex Represented by Formula (1)>>

For example, by reacting the ligand obtained according to the production method in i) to ix) with a metal salt such as a metal halide, a metal sulfate, a metal acetate, a metal nitrate or the like in accordance with the method described in Polyhedron 2006, 25, 2363-2374, J. Org. Chem. 2002, 67, 5753-5772 and the like, a corresponding metal complex can be synthesized. That is, the metal complex can be synthesized by reacting a ligand obtained according to the production method in i) to ix) with a metal salt corresponding to M in formula (1) in a solvent such as methanol, ethanol, water, N,N-dimethylformamide (DMF) or the like.

<<Method for Producing a Composition for an Ultraviolet Absorbent Substance which Comprises at Least One Metal Complex Represented by Formula (1) and at Least One Matrix Material and/or Polymerizable Monomer as a Precursor of a Matrix Material>>

The composition for an ultraviolet absorbent substance in the present invention is either a type in which "the metal complex represented by formula (1) is in a dissolved state" or a type in which "fine particles of the metal complex represented by formula (1) are in a dispersed state" in the composition for an ultraviolet absorbent substance. Each type will be described below.

(i) Composition for an ultraviolet absorbent substance where the metal complex represented by formula (1) is in a dissolved state at the level of a molecule.

Specifically, by combining a solvent having good compatibility with a matrix material and/or a polymerizable monomer as a precursor of a matrix material and good solubility for the metal complex, a homogenous composition for an ultraviolet absorbent substance with the matrix material and the metal complex dissolved in the solvent can be produced.

When a polymerizable monomer as a precursor of a matrix material is used in place of a matrix material, the solvent is not necessarily required, and the polymerizable monomer can be used both as a precursor of a matrix material and a solvent.

For the matrix material, either an organic or inorganic binder can be used. Herein, the inorganic binder refers to an inorganic binder which contains no carbon atom in the polymer backbone chain.

Expression "matrix material" used in the present invention includes not only a matrix component (solid component) called an organic or inorganic binder, but also a solution containing the matrix component (for example, a commercially available binder solution). The present invention also includes an aspect in which the metal complex is dissolved in a solution containing the matrix component without using the solvent.

Examples of the organic binders include thermoplastic or thermosetting synthetic resins such as poly(meth)acrylate resins such as polymethyl(meth)acrylate, polyethyl(meth)acrylate, polypropyl(meth)acrylate, polybutyl(meth)acrylate, polycyclohexyl(meth)acrylate and the like, (meth)acrylate copolymers such as a methyl(meth)acrylate-ethyl(meth)acrylate copolymer, a methyl(meth)acrylate-butyl(meth)acrylate copolymer and the like, polystyrene resins such as polystyrene, poly(α-methylstyrene) and the like, styrene copolymers such as a styrene-butadiene copolymer, a styrene-isoprene copolymer, a styrene-acrylic acid copolymer, a styrene-acrylate copolymer, a styrene-maleic acid copolymer, a styrene-maleate copolymer and the like, polyester resins such as polyethylene succinate, polybutylene adipate, polylactic acid, poly glycolic acid, polycaprolactone, polyethylene terephthalate and the like, polyolefin resins such as polyethylene, polypropylene and the like, polyether resins such as polyoxymethylene, polyethylene oxide and the like, silicone resins, polysulfone resins, polyamide resins, polyimide resins, polyurethane resins, polycarbonate resins, epoxy resins, phenol resins, melamine resins, urea formaldehyde resins, polyvinyl resins and the like, and synthetic rubbers or natural rubbers such as an ethylene-propylene copolymer rubber, a polybutadiene rubber, a styrene-butadiene rubber, an acrylonitrile-butadiene rubber and the like.

From the viewpoint of adhesion properties to a substrate and transparency, preferable are thermoplastic or thermosetting resins such as poly(meth)acrylate resins, polystyrene resins, styrene copolymers, polyester resins, polyolefin resins, polyether resins, silicone resins, polysulfone resins, polyamide resins, polyimide resins, polyurethane resins, polycarbonate resins, epoxy resins, phenol resins, melamine resins, urea formaldehyde resins, and polyvinyl resins, and more preferable are poly(meth)acrylate resins, polystyrene resins, styrene copolymers, polyester resins, polyolefin resins, polyether resins, silicone resins, polycarbonate resins, epoxy resins, phenol resins, polyvinyl resins.

The (meth)acryl refers to methacryl and acryl.

As the inorganic binder, a polysiloxane binder can be suitably used. In this case, a sol solution (siloxane oligomer solution) obtained by a hydrolysis/polycondensation reaction of silicon alkoxide can be suitably used as a polysiloxane binder precursor.

The sol solution of a silicon alkoxide can be normally prepared by adding water to silicon alkoxide in an organic solvent in the presence of an acid catalyst and subjecting the resulting mixture to hydrolysis/polycondensation, but a commercially available sol solution may be used. Hereinbelow, a method for preparing a sol solution of silicon alkoxide will be specifically described.

(Silicon Alkoxide)

Examples of silicon alkoxides include tetrafunctional alkoxysilanes such as tetramethoxysilane, tetraethoxysilane, tetrapropoxysilane, tetrabutoxysilane and the like, trifunctional alkoxysilanes such as methyltrimethoxysilane, methyltriethoxysilane, methyltripropoxysilane, methyltributoxysilane, methyl-tris(2-methoxyethoxy)silane, ethyltrimethoxysilane, ethyltriethoxysilane, ethyltripropoxysilane, ethyltributoxysilane, ethyl-tris(2-methoxyethoxy)silane, hexyltrimethoxysilane, hexyltriethoxysilane, hexyltripropoxysilane, hexyltributoxysilane, phenyltrimethoxysilane, phenyltriethoxysilane, phenyltripropoxysilane, phenyltributoxysilane, vinyltrimethoxysilane, vinyltriethoxysilane, γ-methacryloxypropyltrimethoxysilane, methyldimethoxy(ethoxy)silane, ethyldiethoxy(methoxy)silane and the like, and bifunctional alkoxysilanes such as dimethyldimethoxysilane, dimethyldiethoxysilane, bis(2-methoxyethoxy)dimethylsilane, diethyldiethoxysilane, diphenyldimethoxysilane, diphenyldiethoxysilane and the like.

Among them, preferable are tetramethoxysilane, tetraethoxysilane, methyltrimethoxysilane, methyltriethoxysilane, ethyltrimethoxysilane, ethyltriethoxysilane, phenyltrimethoxysilane, phenyltriethoxysilane, dimethyldimethoxysilane, dimethyldiethoxysilane, diphenyldimethoxysilane and diphenyldiethoxysilane from the viewpoint of the state and strength of a film obtained and economy.

These silicon alkoxides may be used alone or in combination of two or more kinds. In the case where they are used in combination of two or more kinds, the mixing ratio can be appropriately selected as desired.

For imparting desired properties to a coating film which is finally obtained, a metal alkoxide such as titanium alkoxide, cerium alkoxide, zirconium alkoxide, tin alkoxide, aluminum alkoxide, nickel alkoxide, zinc alkoxide or the like may be added/combined as required.

For example, it is effective to add/combine titanium alkoxide or zinc alkoxide to raise the reflectance, zirconium alkoxide to raise the mechanical strength and alkali resistance, and nickel alkoxide to improve the weather resistance.

(Acid Catalyst)

Acid catalysts are not particularly limited, but include, for example, inorganic acids such as nitric acid, hydrochloric acid, sulfuric acid and the like and organic acids such as formic acid, acetic acid, oxalic acid and the like. Since condensation stability is compromised if an acid remains after completion of a hydrolysis/polycondensation reaction, it is preferable to use formic acid, which has a low boiling point, high volatility and low PKa.

The added amount of acid catalyst is not particularly limited as long as a satisfactory catalytic action is exhibited, but is normally 0.01 mol or more, more preferably 0.3 mol or more based on 1 mol of silicon alkoxide. A satisfactory catalytic action may not be obtained if the added amount of acid catalyst is less than 0.01 mol, while the sol solution of silicon alkoxide which is finally obtained may be degraded over time by a remaining acid if the acid catalyst is excessively added. Therefore, it is preferable to blend the acid catalyst in a ratio of 1 mol or less based on 1 mol of silicon alkoxide.

(Water)

The added amount of water is not particularly limited as long as hydrolysis of the silicon alkoxide can be produced, but it is preferable to add water in a ratio of 2 to 6 mol based on 1 mol of silicon alkoxide. Hydrolysis may not satisfactorily proceed if the added amount of water is less than 2 mol, while hydrolysis proceeds so rapidly that progress of a subsequent polycondensation reaction is hindered and in addition, the amount of water to be removed after the reaction increases, thus being inefficient if the added amount of water is more than 6 mol.

(Reaction Solvent)

By using a reaction solvent in addition to silicon alkoxide, water and an acid catalyst, a hydrolysis rate can be moderately reduced to allow hydrolysis/polycondensation to proceed reliably. The solvent also serves as a diluent for adjusting to a level for easy handling the viscosity of a sol solution of silicon alkoxide (siloxane oligomer solution) which is finally obtained.

The reaction solvent is not particularly limited as long as the silicon alkoxide is dissolved therein, and can be appropriately selected and used. Examples of the reaction solvent include alcohols such as methanol, ethanol, isopropanol (IPA), butanol, tetrafluoropropanol and the like, halogenated hydrocarbons such as chloroform, dichloromethane and the like, glycols such as ethylene glycol, 1,2-propanediol, 1,3-propanediol, 1,4-butanediol, diethylene glycol and the like, ketones such as acetone, methyl ethyl ketone (MEK), methyl isobutyl ketone, cyclopentanone, cyclohexanone, 2-heptanone, 3-heptanone, 3-octanone and the like, esters such as ethyl acetate, ethyl 2-hydroxypropionate, n-butyl 3-methyl-3-methoxypropionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate and the like, ethers such as diethyl ether, cyclopentyl methyl ether, tetrahydrofuran and the like, aromatics such as toluene, xylene, monochlorobenzene, dichlorobenzene and the like, hydrocarbons such as n-pentane, cyclopentane, n-hexane, cyclohexane, n-heptane, cycloheptane and the like, lactams such as 2-pyrrolidone, N-methyl-2-pyrrolidone, ∈-caprolactam and the like, glycol ethers such as ethylene glycol monomethyl ether acetate, diethylene glycol monomethyl ether, diethylene glycol dimethyl ether, diethylene glycol monoethyl ether, diethylene glycol mono-n-butyl ether acetate, propylene glycol monomethyl ether acetate (PGMEA), propylene glycol monoethyl ether acetate and the like, and others such as acetonitrile, sulfolane, dimethyl sulfoxide, DMF and the like.

From the viewpoint of reactivity and economy, preferable are alcohols such as methanol, ethanol, IPA, butanol, tetrafluoropropanol and the like, glycols such as ethylene glycol, 1,2-propanediol, 1,3-propanediol, 1,4-butanediol, diethylene glycol and the like, esters such as ethyl acetate, ethyl 2-hydroxypropionate, n-butyl 3-methyl-3-methoxypropionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate and the like, ethers such as diethyl ether, cyclopentyl methyl ether, tetrahydrofuran and the like, and glycol ethers such as ethylene glycol monomethyl ether acetate, diethylene glycol monomethyl ether, diethylene glycol dimethyl ether, diethylene glycol monoethyl ether, diethylene glycol mono-n-butyl ether acetate, PGMEA and propylene glycol monoethyl ether acetate, and the like.

In the case where the metal complex represented by formula (1) is dissolved and mixed in the sol solution of silicon alkoxide (siloxane oligomer solution) in a post-process, efforts for dissolving and mixing the metal complex can be reduced by using a solvent having good solubility for the metal complex as a reaction solvent in advance.

However, even when a sol solution of silicon alkoxide (siloxane oligomer solution) in a main process is prepared using a poor solvent for the metal complex, the metal complex can be dissolved and mixed by replacing a solvent of the sol solution of silicon alkoxide (siloxane oligomer solution) with a good solvent for the metal complex or adding a good solvent for the metal complex to the sol solution of silicon alkoxide (siloxane oligomer solution) before dissolving and mixing the metal complex.

It is desirable that the amount of the reaction solvent used be in a range of 50 to 1000 parts by weight, preferably 100 to 500 parts by weight based on 100 parts by weight of silicon alkoxide. It may become difficult to allow a hydrolysis/polycondensation to proceed at an appropriate reaction rate if the amount of reaction solvent used is less than 50 parts by weight, while the rate of the hydrolysis/polycondensation reaction decreases, thus being inefficient, and in addition, a long time period may be required for the decompression/distillation process described later if the amount of reaction solvent used is more than 1000 parts by weight.

First, one or more kinds of silicon alkoxide are mixed with an acid catalyst, water and a solvent. This solution is kept at a temperature of 0 to 150° C., preferably 50 to 100° C. to thereby allow the hydrolysis/polycondensation to proceed. If the temperature is lower than 0° C., it may become difficult for the hydrolysis/polycondensation to proceed. If the temperature is higher than 150° C., the hydrolysis/polycondensation reaction may proceed so rapidly that unreacted alkoxy groups remain, and gelation and coloring result. Time for the hydrolysis/polycondensation reaction depends on temperature conditions, but is normally 1 to 24 hours, more preferably 2 to 8 hours. The hydrolysis/polycondensation reaction may not satisfactorily proceed if the time is less than an hour, and even if the time is more than 24 hours, the reaction does not proceed any further, thus being uneconomical.

A reaction liquid is preferably distilled away under a reduced pressure after completion of the reaction or during the reaction for removing an alcohol produced as a byproduct and water by the hydrolysis/polycondensation reaction to outside the system. It is preferable to allow the reaction to proceed while distilling away the reaction liquid under a reduced pressure because an effect of improving the reaction rate of the polycondensation reaction can be expected. If using in this process a catalyst having a low boiling point and high volatility, such as formic acid and the like as the acid catalyst, an acid catalyst can be also removed to outside the system together with a solvent to ensure stability of a sol solution after the completion of the reaction.

By allowing the hydrolysis/polycondensation reaction to proceed in this way, a sol solution of silicon alkoxide (siloxane oligomer solution) as an inorganic binder: polysiloxane binder precursor can be obtained.

These matrix materials may be used alone or in combination of two or more kinds. If used in combination, two or more different materials selected from organic binders may be combined, two or more different materials selected from inorganic binders may be combined, or two or more different materials selected, respectively, from organic binders and inorganic binders may be combined.

The solvent having good compatibility with a matrix material and/or a polymerizable monomer as a precursor of a matrix material and good solubility for the metal complex can be appropriately selected according to the types of a matrix material and/or a polymerizable monomer as a precursor of a matrix material to be used and the metal complex, and used. Examples of the solvent include alcohols such as methanol, ethanol, IPA, butanol, tetrafluoropropanol and the like, glycols such as ethylene glycol, 1,2-propanediol, 1,3-propanediol, 1,4-butanediol, diethylene glycol and the like, halogenated hydrocarbons such as chloroform, dichloromethane and the like, ketones such as acetone, MEK, methyl isobutyl ketone, cyclopentanone, cyclohexanone, 2-heptanone, 3-octanone and the like, esters such as ethyl acetate, ethyl 2-hydroxypropionate, n-butyl 3-methyl-3-methoxypropionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate and the like, ethers such as diethyl ether, cyclopentyl methyl ether, tetrahydrofuran and the like, aromatics such as toluene, xylene, monochlorobenzene, dichlorobenzene and the like, hydrocarbons such as n-pentane, cyclopentane, n-hexane, cyclohexane, n-heptane, cycloheptane and the like, lactams such as 2-pyrrolidone, N-methyl-2-pyrrolidone, ∈-caprolactam and the like, glycol ethers such as ethylene glycol monomethyl ether acetate, diethylene glycol monomethyl ether, diethylene glycol dimethyl ether, diethylene glycol monoethyl ether, diethylene glycol mono-n-butyl ether acetate, PGMEA, propylene glycol monoethyl ether acetate and the like, and others such as acetonitrile, sulfolane, dimethyl sulfoxide, DMF and the like.

Among them, those which are more preferable from the viewpoint of solubility of the metal complex are alcohols such as methanol, ethanol, IPA, butanol, tetrafluoropropanol and the like, halogenated hydrocarbons such as chloroform, dichloromethane and the like, ketones such as acetone, MEK, methyl isobutyl ketone, cyclopentanone, cyclohexanone, 2-heptanone, 3-octanone and the like, esters such as ethyl acetate, ethyl 2-hydroxypropionate, n-butyl 3-methyl-3-methoxypropionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate and the like, ethers such as diethyl ether, cyclopentyl methyl ether, tetrahydrofuran and the like, aromatics such as toluene, xylene, monochlorobenzene, dichlorobenzene and the like, lactams such as 2-pyrrolidone, N-methyl-2-pyrrolidone, ∈-caprolactam and the like, glycol ethers such as ethylene glycol monomethyl ether acetate, diethylene glycol monomethyl ether, diethylene glycol dimethyl ether, diethylene glycol monoethyl ether, diethylene glycol mono-n-butyl ether acetate, PGMEA, propylene glycol monoethyl ether acetate and the like, and others such as acetonitrile, sulfolane, dimethyl sulfoxide, DMF and the like.

Further preferable are tetrafluoropropanol and the like as alcohols, chloroform, dichloromethane and the like as halogenated hydrocarbons, MEK, cyclopentanone, cyclohexanone and the like as ketones, γ-butyrolactone, ethyl lactate and the like as esters, cyclopentyl methyl ether, tetrahydrofuran and the like as ethers, toluene, xylene, monochlorobenzene, dichlorobenzene and the like as aromatics, 2-pyrrolidone, N-methyl-2-pyrrolidone, ∈-caprolactam and the like as lactams, PGMEA and the like as glycol ethers, and sulfolane, dimethyl sulfoxide, DMF and the like as others.

The polymerizable monomer may be used as a precursor of a matrix material, or may be used as the solvent. Examples of the polymerizable monomers include styrene monomers such as styrene, α-methylstyrene, β-methylstyrene, 2,4-dimethylstyrene, α-ethylstyrene, α-butylstyrene, α-hexylstyrene, 4-chlorostyrene, 3-chlorostyrene, 4-bromostyrene, 4-nitrostyrene, 4-methoxystyrene, vinyltoluene and the like, (meth)acrylic acid, (meth)acrylates such as methyl(meth)acrylate, ethyl(meth)acrylate, n-propyl(meth)acrylate, isopropyl(meth)acrylate, n-butyl(meth)acrylate, sec-butyl(meth)acrylate, tert-butyl(meth)acrylate, 2-methylbutyl(meth)acrylate, 2-ethylbutyl(meth)acrylate, 3-methylbutyl(meth)acrylate, 1,3-dimethylbutyl(meth)acrylate, pentyl(meth)acrylate, hexyl(meth)acrylate, 2-ethylhexyl(meth)acrylate, heptyl(meth)acrylate, octyl(meth)acrylate, 2-ethoxyethyl(meth)acrylate, 3-ethoxypropyl(meth)acrylate, 2-ethoxybutyl(meth)acrylate, 3-ethoxybutyl(meth)acrylate, dimethylaminoethyl(meth)acrylate, hydroxyethyl(meth)acrylate, hydroxypropyl(meth)acrylate, hydroxybutyl(meth)acrylate, ethyl-α-(hydroxymethyl) (meth)acrylate, methyl-α-(hydroxymethyl) (meth)acrylate, phenyl(meth)acrylate, benzyl(meth)acrylate, phenylethyl(meth)acrylate, trimethylolpropane tri(meth)acrylate, hexanediol di(meth)acrylate, tripropylene glycol di(meth)acrylate, diethylene glycol di(meth)acrylate, pentaerythritol tetra(meth)acrylate, dipentaerythritol hexa(meth)acrylate, neopentyl glycol di(meth)acrylate and the like, alicyclic epoxy compounds such as 3,4-epoxycyclohexylmethyl-3,4-epoxycyclohexane carboxylate, 3,4-epoxycyclohexylethyl-3,4-epoxycyclohexane carboxylate, vinylcyclohexene dioxide, allylcyclohexene dioxide, 3,4-epoxy-4-methylcyclohexyl-2-propylene oxide, bis(3,4-epoxycyclohexyl)ether and the like, compounds obtained by glycidyl-etherification of bisphenol A, bisphenol F, brominated bisphenol A, biphenol, resorcin and the like, oxetane compounds such as trimethylene oxide, 3-ethyl-3-hydroxymethyloxetane, 3,3-dimethyloxetane, 3,3-dichloromethyloxetane, 3-ethyl-3-phenoxymethyloxetane, 3-ethyl-3-[{(3-ethyloxetanyl)methoxy}methyl]oxetane, bis(3-ethyl-3-oxetanylmethyl)ether, 1,4-bis[{(3-ethyl-3-oxetanyl)methoxy}methyl]benzene, tri[(3-ethyl-3-oxetanylmethoxy)methyl]benzene, bis[(3-ethyl-3-oxetanylmethoxy)methylphenyl]ether, (3-ethyl-3-oxetanylmethoxy)oligodimethylsiloxane and the like as organic polymerizable monomers.

As the inorganic polymerizable monomer, for example, tetrafunctional alkoxysilanes such as tetramethoxysilane, tetraethoxysilane, tetrapropoxysilane, tetrabutoxysilane and the like, trifunctional alkoxysilanes such as methyltrimethoxysilane, methyltriethoxysilane, methyltripropoxysilane, methyltributoxysilane, methyl-tris(2-methoxyethoxy)silane, ethyltrimethoxysilane, ethyltriethoxysilane, ethyltripropoxysilane, ethyltributoxysilane, ethyl-tris(2-methoxyethoxy)silane, hexyltrimethoxysilane, hexyltriethoxysilane, hexyltripropoxysilane, hexyltributoxysilane, phenyltrimethoxysilane, phenyltriethoxysilane, phenyltripropoxysilane, phenyltributoxysilane, vinyltrimethoxysilane, vinyltriethoxysilane, γ-methacryloxypropyltrimethoxysilane, methyldimethoxy(ethoxy)silane, ethyldiethoxy(methoxy)silane and the like, bifunctional alkoxysilanes such as dimethyldimethoxysilane, dimethyldiethoxysilane, bis(2-methoxyethoxy)dimethylsilane, diethyldiethoxysilane, diphenyldimethoxysilane, diphenyldiethoxysilane and the like, metal alkoxides such as titanium alkoxide, cerium alkoxide, zirconium alkoxide, tin alkoxide, aluminum alkoxide, nickel alkoxide, zinc alkoxide, and the like can be used.

Herein, the inorganic polymerizable monomer refers to an inorganic polymerizable monomer containing no carbon atom in a polymer backbone chain formed by a polymerization reaction.

These solvents may be used alone or in combination of two or more kinds. In the case where a mixed solvent of combined two or more kinds of solvents is used, the mixing ratio can be appropriately selected.

The amount of the solvent used can be appropriately adjusted in consideration of the desired concentration of the metal complex in the composition for an ultraviolet absorbent substance, the kind of a solvent used, the solubility of a precursor of a matrix material used, and the like, and is not particularly limited, but is normally 50 to 100000 parts by weight, preferably 100 to 5000 parts by weight, more preferably 200 to 3000 parts by weight based on 100 parts by weight of the metal complex from the viewpoint of solubility of the metal complex. If the amount of the solvent used is less than 50 parts by weight, the metal complex may not be completely dissolved, and the visible light transmittance of an ultraviolet absorbent substance which is finally obtained may be reduced. If the amount of the solvent used is more than 100000 parts by weight, the concentration of the metal complex in the composition for an ultraviolet absorbent substance may be reduced, so that a satisfactory ultraviolet ray absorbing capability cannot be imparted to an ultraviolet absorbent substance which is finally obtained.

For dissolving the metal complex and a matrix material and/or a polymerizable monomer as a precursor of a matrix material in a solvent, the matrix material and/or polymerizable monomer as a precursor of a matrix material may be beforehand dissolved in a solvent, followed by adding thereto the metal complex, the metal complex may be beforehand dissolved in a solvent, followed by mixing the solution with the matrix material and/or polymerizable monomer as a precursor of a matrix material and dissolving the same, or the metal complex and the matrix material and/or polymerizable monomer as a precursor of a matrix material may be mixed with and dissolved in a solvent at the same time.

Even in the case where the polymerizable monomer is used both as a precursor of a matrix material and a solvent, the metal complex and the polymerizable monomer can be mixed and dissolved in the same procedure.

Herein, if the matrix material used is a solution containing a dissolved matrix component and the solvent of the solution is a good solvent for the metal complex, it may be only necessary to mix the metal complex and the matrix material (solution containing a dissolved matrix component).

A light absorbent which has been known can also be combined as required within the bounds of not impairing the effect of the present invention.

The light absorbents which can be combined are not particularly limited, but include, for example, organic pigments such as phthalocyanine-based, quinacridone-based, quinacridonequinone-based, benzimidazolon-based, quinone-based, anthanthrone-based, dioxazine-based, diketo-pyrrolo-pyrrole-based, anthanthrone-based, indanthrone-based, flavanthrone-based, perinone-based, perylene-based, isoindolin-based, isoindolinone-based, azo-based, cyanine-based, azacyanine-based, squarylium-based, triarylmethane-based pigments and the like, metal complex-based pigments such as benzenedithiol metal complex-based, dithiolene metal complex-based, azo metal-based, metal phthalocyanine-based, metal naphthalocyanine-based, porphyrin metal complex-based pigments and the like, and organic ultraviolet absorbents such as benzophenone-based, benzotriazole-based, triazine-based, salicylate-based, salicylic acid phenyl ester-based, hindered amine-based, hindered phenol-based, benzoate-based, phosphorus-based, amide-based, amine-based, sulfur-based ultraviolet absorbents and the like. From the viewpoint of economy and a light absorbing capability, preferable are organic pigments such as phthalocyanine-based, quinone-based, perylene-based, azo-based, cyanine-based, azacyanine-based, squarylium-based and triarylmethane-based pigments and the like, and organic ultraviolet absorbents such as benzophenone-based, benzotriazole-based, triazine-based, hindered amine-based, hindered phenol-based, benzoate-based, phosphorus-based, amine-based and sulfur-based ultraviolet absorbents and the like.

A curing agent, a curing catalyst, a crosslinker, a coupling agent, a leveling agent, a lubricant, an antistatic agent, an antioxidant, a heat stabilizer, a fire retardant, a filler, a colorant, a photocatalyst material, a rust inhibitor, a water repellent, an electrically conductive material, an antiblocking material, a softener, a release agent, a fluorescent whitener and the like may be appropriately added within the bounds of not impairing the effect of the present invention.

If a polymerization process is provided for preparing the ultraviolet absorbent substance described later when a polymerizable monomer is used, a polymerization initiator may be specially combined. The polymerization initiator is not particularly limited, and can be appropriately selected according to the kind of polymerizable monomer used. The amount of polymerization initiator used can be appropriately selected according to the activities of a polymerizable monomer and a polymerization initiator.

Examples of radical polymerization initiators for use in heat curing may include azo compounds such as 2,2'-azobisisobutyronitrile, 2,2'-azobis(2-methylbutyronitrile), 2,2'-azobisisovaleronitrile, 2,2'-azobis(2,4-dimethylvaleronitrile), 1,1'-azobis(cyclohexanone-1-carbonitrile) and the like, ketone peroxides such as methyl ethyl ketone peroxide, methyl isobutyl ketone peroxide, cyclohexanone peroxide and the like, and diacyl peroxides such as benzoyl peroxide, lauroyl peroxide, 2,4-dichlorobenzoyl peroxide and the like.

Examples of Radical polymerization initiators for use in light curing may include p-isopropyl-α-hydroxyisobutylphenone, α-hydroxyisobutylphenone, 2,2-dimethoxy-2-phenylacetophenone, 4'-methylthio-2,2-dimethyl-2-morpholinoacetophenone, benzoinisobutylether, 2-chlorothioxanthone, 2,4,6-trimethylbenzoyldiphenylphosphine oxide, bis(2,4,6-trimethylbenzoyl)-phenylphosphine oxide and the like.

Examples of cationic polymerization initiators for use in heat curing may include Lewis acids such as a boron trifluoride/diethyl ether complex, a boron trifluoride/amine complex, aluminum chloride, titanium tetrachloride, tin tetrachloride, iron chloride (III), zinc chloride and the like, ammonium salts, sulfonium salts, oxonium salts, phosphonium salts and the like.

Examples of cationic polymerization initiators for use in light curing may include aromatic sulfonium salts, aromatic iodonium salts, aromatic diazonium salts, aromatic phosphonium salts and the like.

Examples of curing agents, which are used when an epoxy monomer is used as the polymerizable monomer, may include acid anhydrides such as phthalic anhydride, tetrahydrophthalic anhydride, hexahydrophthalic anhydride, trimellitic anhydride, pyromellitic anhydride, chlorendic anhydride, methyltetrahydrophthalic anhydride, methylhexahydrophthalic anhydride, dodecenylsuccinic anhydride, methylendomethylene tetrahydrophthalic anhydride and the like, aliphatic amines such as diethylenetriamine, triethylenediamine, triethylenetetramine, tetraethylenepentamine, diethylaminopropylamine, N-aminoethylpiperazine, isophoronediamine, mensendiamine, piperidine, N,N-dimethylpiperazine and the like, aromatic amines such as m-phenylenediamine, 4,4'-diaminodiphenylmethane, 4,4'-diaminodiphenylsulfone and the like, imidazoles such as 2-methylimidazole, 2-ethyl-4-methylimidazole and the like, Lewis acids such as a boron trifluoride/amine complex, aluminum chloride, titanium tetrachloride, tin tetrachloride, iron chloride (III), zinc chloride and the like, ammonium salts, sulfonium salts, oxonium salts, phosphonium salts, polymercaptan, polysulfide and the like.

Particularly, acid anhydrides are preferable from the viewpoint of improvement of mechanical properties of an epoxy resin after polymerization, and those which are liquid at ordinary temperature are preferable in terms of operability. Specifically, examples of the curing agents include methyltetrahydrophthalic anhydride, methylhexahydrophthalic anhydride, dodecenylsuccinic anhydride, methylendomethylene tetrahydrophthalic anhydride and the like.

In the case of use of an acid anhydride which is solid at ordinary temperature, for example, an acid anhydride such as phthalic anhydride, tetrahydrophthalic anhydride, hexahydrophthalic anhydride, methyltetrahydrophthalic anhydride or the like, the acid anhydride is preferably dissolved in an acid anhydride which is liquid at ordinary temperature, and used as a mixture which is liquid at ordinary temperature, in terms of operations.

For accelerating the curing reaction of an epoxy monomer, further a curing accelerator may also be used. The curing accelerator can be used alone or in mixture of two or more kinds. Examples of the curing accelerator include tertiary amines and imidazoles and/or organic carboxylates thereof such as 2-ethyl-4-methylimidazole, 2-methylimidazole, 1-cyanoethyl-2-ethyl-4-methylimidazole, benzyldimethylamine, 2,4,6-tris(diaminomethyl)phenol, 1,8-diazabiscyclo(5,4,0)undecene-7 and octylates thereof and the like, phosphines and/or quaternary salts thereof such as triphenylphosphine, tributylphosphine, benzyltriphenylphosphonium bromide, benzyltributylphosphonium bromide and the like, organic metal carboxylates such as zinc octylate, zinc laurate, zinc stearate, tin octylate and the like, metal-organic chelate compounds such as an acetylacetone zinc chelate, a benzoylacetone zinc chelate, a dibenzoylmethane zinc chelate and an ethyl acetoacetate zinc chelate composed of zinc and β-diketone, and the like, aromatic sulfonium salts and the like.

(ii) Composition for an ultraviolet absorbent substance where fine particles of the metal complex are in a dispersed state Specifically, by using a dispersion medium having sufficiently low solubility for the metal complex and good compatibility with a matrix material and/or a polymerizable monomer as a precursor of a matrix material, a composition for an ultraviolet absorbent substance with fine particles of the metal complex dispersed in a dispersion medium containing a dissolved matrix material and/or polymerizable monomer as a precursor of a matrix material can be produced.

When a polymerizable monomer as a precursor of a matrix material is used in place of a matrix material, the dispersion medium is not necessarily required, and the polymerizable monomer can be used both as a precursor of a matrix material and a dispersion medium.

If the matrix material used is a solution containing a dissolved matrix component and the solvent of the solution has sufficiently low solubility for the metal complex, it is not necessarily required to combine the dispersion medium, and it is also possible to disperse fine particles of the metal complex directly in the matrix material (solution containing a dissolved matrix component).

The metal complex may be beforehand dispersed in an appropriate dispersion medium to prepare a dispersion liquid of the metal complex fine particles, followed by dissolving a matrix material and/or polymerizable monomer as a precursor of a matrix material in the dispersion, or a matrix material and/or polymerizable monomer as a precursor of a matrix material may be beforehand dissolved in an appropriate dispersion medium, followed by dispersing therein the metal complex.

Even in the case where the polymerizable monomer is used both as a precursor of a matrix material and a dispersion medium, the metal complex and the polymerizable monomer can be mixed and dispersed in the same procedure.

For the matrix material, either an organic or inorganic binder can be used, and the material can be appropriately selected from the range same as that described in the item "(i) Composition for an ultraviolet absorbent substance where the metal complex represented by formula (1) is in a dissolved state at the level of a molecule" and used.

The dispersion medium having sufficiently low solubility for the metal complex and good compatibility with a matrix material and/or a polymerizable monomer as a precursor of a matrix material can be appropriately selected according to the types of a matrix material and/or a polymerizable monomer as a precursor of a matrix material and the metal complex to be used, and used. Examples of the dispersion medium include water, alcohols such as methanol, ethanol, IPA, butanol, tetrafluoropropanol and the like, halogenated hydrocarbons such as chloroform, dichloromethane and the like, glycols such as ethylene glycol, 1,2-propanediol, 1,3-propanediol, 1,4-butanediol, diethylene glycol and the like, ketones such as acetone, MEK, methyl isobutyl ketone, cyclopentanone, cyclohexanone, 2-heptanone, 3-heptanone, 3-octanone and the like, esters such as ethyl acetate, ethyl 2-hydroxypropionate, n-butyl 3-methyl-3-methoxypropionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate and the like, ethers such as diethyl ether, cyclopentyl methyl ether, tetrahydrofuran and the like, aromatics such as toluene, xylene, monochlorobenzene, dichlorobenzene and the like, hydrocarbons such as n-pentane, cyclopentane, n-hexane, cyclohexane, n-heptane, cycloheptane and the like, lactams such as 2-pyrrolidone, N-methyl-2-pyrrolidone, ∈-caprolactam and the like, glycol ethers such as ethylene glycol monomethyl ether acetate, diethylene glycol monomethyl ether, diethylene glycol dimethyl ether, diethylene glycol monoethyl ether, diethylene glycol mono-n-butyl ether acetate, PGMEA, propylene glycol monoethyl ether acetate and the like, and others such as acetonitrile, sulfolane, dimethyl sulfoxide, DMF and the like.

The preferred dispersion medium varies depending on the types of the metal complex and a matrix material and/or polymerizable monomer as a precursor of a matrix material used, but from the viewpoint of economy, dispersibility and stability of a dispersion liquid, preferable are water, methanol, ethanol, IPA, butanol, ethylene glycol, 1,2-propanediol, 1,3-propanediol, 1,4-butanediol, diethylene glycol, acetone, MEK, methyl isobutyl ketone, ethyl acetate, diethyl ether, toluene, xylene, n-hexane, cyclohexane, n-heptane, ∈-caprolactam, ethylene glycol monomethyl ether acetate, PGMEA, and diethylene glycol dimethyl ether, and more preferable are water, metanol, ethanol, IPA, PGMEA, ethylene glycol, toluene, xylene, cyclohexane and n-heptane.

The polymerizable monomer may be used as a precursor of a matrix material, or may be used as the dispersion medium. Examples of the polymerizable monomers include styrene monomers such as styrene, α-methylstyrene, β-methylstyrene, 2,4-dimethylstyrene, α-ethylstyrene, α-butylstyrene, α-hexylstyrene, 4-chlorostyrene, 3-chlorostyrene, 4-bromostyrene, 4-nitrostyrene, 4-methoxystyrene, vinyltoluene and the like, (meth)acrylic acid, (meth)acrylates such as methyl(meth)acrylate, ethyl(meth)acrylate, n-propyl(meth)acrylate, isopropyl(meth)acrylate, n-butyl(meth)acrylate, sec-butyl(meth)acrylate, tert-butyl(meth)acrylate, 2-methylbutyl(meth)acrylate, 2-ethylbutyl(meth)acrylate, 3-methylbutyl(meth)acrylate, 1,3-dimethylbutyl(meth)acrylate, pentyl(meth)acrylate, hexyl(meth)acrylate, 2-ethylhexyl(meth)acrylate, heptyl(meth)acrylate, octyl(meth)acrylate, 2-ethoxyethyl(meth)acrylate, 3-ethoxypropyl(meth)acrylate, 2-ethoxybutyl(meth)acrylate, 3-ethoxybutyl(meth)acrylate, dimethylaminoethyl(meth)acrylate, hydroxyethyl (meth)acrylate, hydroxypropyl(meth)acrylate, hydroxybutyl (meth)acrylate, ethyl-α-(hydroxymethyl) (meth)acrylate, methyl-α-(hydroxymethyl) (meth)acrylate, phenyl(meth) acrylate, benzyl(meth)acrylate, phenylethyl(meth)acrylate, trimethylolpropane tri(meth)acrylate, hexanediol di(meth) acrylate, tripropylene glycol di(meth)acrylate, diethylene glycol di(meth)acrylate, pentaerythritol tetra(meth)acrylate, dipentaerythritol hexa(meth)acrylate, neopentyl glycol di(meth)acrylate and the like, alicyclic epoxy compounds such as 3,4-epoxycyclohexylmethyl-3,4-epoxycyclohexane carboxylate, 3,4-epoxycyclohexylethyl-3,4-epoxycyclohexane carboxylate, vinylcyclohexene dioxide, allylcyclohexene dioxide, 3,4-epoxy-4-methylcyclohexyl-2-propylene oxide, bis(3,4-epoxycyclohexyl)ether and the like, compounds obtained by glycidyl-etherification of bisphenol A, bisphenol F, brominated bisphenol A, biphenol, resorcin and the like, oxetane compounds such as trimethylene oxide, 3-ethyl-3-hydroxymethyloxetane, 3,3-dimethyloxetane, 3,3-dichloromethyloxetane, 3-ethyl-3-phenoxymethyloxetane, 3-ethyl-3-[{(3-ethyloxetanyl)methoxy}methyl]oxetane, bis(3-ethyl-3-oxetanylmethyl)ether, 1,4-bis[{(3-ethyl-3-oxetanyl)methoxy}methyl]benzene, tri[(3-ethyl-3-oxetanylmethoxy)methyl]benzene, bis[(3-ethyl-3-oxetanylmethoxy)methylphenyl]ether, (3-ethyl-3-oxetanylmethoxy)oligodimethylsiloxane and the like as organic polymerizable monomers.

Examples of inorganic polymerizable monomers include tetrafunctional alkoxysilanes such as tetramethoxysilane, tetraethoxysilane, tetrapropoxysilane, tetrabutoxysilane and the like, trifunctional alkoxysilanes such as methyltrimethoxysilane, methyltriethoxysilane, methyltripropoxysilane, methyltributoxysilane, methyl-tris(2-methoxyethoxy)silane, ethyltrimethoxysilane, ethyltriethoxysilane, ethyltripropoxysilane, ethyltributoxysilane, ethyl-tris(2-methoxyethoxy)silane, hexyltrimethoxysilane, hexyltriethoxysilane, hexyltripropoxysilane, hexyltributoxysilane, phenyltrimethoxysilane, phenyltriethoxysilane, phenyltripropoxysilane, phenyltributoxysilane, vinyltrimethoxysilane, vinyltriethoxysilane, γ-methacryloxypropyltrimethoxysilane, methyldimethoxy(ethoxy)silane, ethyldiethoxy(methoxy)silane and the like, bifunctional alkoxysilanes such as dimethyldimethoxysilane, dimethyldiethoxysilane, bis(2-methoxyethoxy)dimethylsilane, diethyldiethoxysilane, diphenyldimethoxysilane, diphenyldiethoxysilane and the like, metal alkoxides such as titanium alkoxide, cerium alkoxide, zirconium alkoxide, tin alkoxide, aluminum alkoxide, nickel alkoxide, zinc alkoxide and the like.

Herein, the inorganic polymerizable monomer refers to an inorganic polymerizable monomer containing no carbon atom in a polymer backbone chain formed by a polymerization reaction.

These dispersion media may be used alone or in combination of two or more kinds. In the case where a mixed dispersion medium of combined two or more kinds of dispersion media is used, the mixing ratio can be appropriately selected.

Fine particles of the metal complex are hindered, so that a stable dispersion cannot be obtained, unless the dispersion medium used has sufficiently low solubility for the metal complex. The reason for this has not been made clear, but is probably ascribable to the mechanism described below.

Dispersion stabilization of fine particles of the metal complex is provided in such a manner that the dispersant described later is adsorbed onto the surfaces of fine particles of the metal complex generated in a grinding/dispersion process, and reaggregation of fine particles is suppressed by electrostatic repulsion and steric repulsion of the adsorbed dispersants to bring about a stable dispersed state. If a good solvent for the metal complex is present in this dispersion system, however, two actions, i.e. "an adsorption action of a dispersant" and "a dissolution action of a solvent" for fine particles of the metal complex compete against each other, and adsorption of the dispersant is partly impeded by the dissolution action of the solvent, resulting in hindrance of fine particles and reduction of dispersion stability as well.

The amount of the dispersion medium used can be appropriately adjusted in consideration of the desired concentration of the metal complex in the composition for an ultraviolet absorbent substance, the solubility of a matrix material and/or polymerizable monomer as a precursor of a matrix material used, and the like, and is not particularly limited, but is normally 40 to 9900 parts by weight, preferably 100 to 1900 parts by weight based on 100 parts by weight of the metal complex from the viewpoint of dispersibility of the metal complex. If the amount of the dispersion medium used is less than 40 parts by weight, dispersion stability of the metal complex fine particles may be reduced. If the amount of the dispersion medium used is more than 9900 parts by weight, a satisfactory shearing force cannot be imparted because the solid concentration decreases, and thus time required for forming the metal complex into fine particles may be increased to compromise efficiency.

The average particle diameter of the metal complex fine particles in the composition for an ultraviolet absorbent substance is 10 nm to 200 nm (inclusive), preferably 10 nm to 150 nm (inclusive), more preferably 10 nm to 120 nm (inclusive), further preferably 10 nm to 100 nm (inclusive). If the average particle diameter is more than 200 nm, the visible light transmittance may be considerably reduced, and the mechanical strength of a coating film which is finally obtained may be degraded. Furthermore, if the particle diameter is more than 200 nm, an ultraviolet ray absorbing capability appropriate for the added amount cannot be obtained due to a reduction in the surface area of the particle, thus being disadvantageous in terms of costs. If the average particle diameter is 10 nm or less, particles are brought into a state close to a dissolved state and the visible light transmittance thus is improved, but light resistance may be reduced to impair merits associated with use in a dispersion system.

(Disperser)

Dispersers which can be used for forming the metal complex into fine particles are not particularly limited, but include, for example, media type dispersers such as a paint shaker, a ball mill, a nano-mill, an attritor, a basket mill, sand mill, a sand grinder, a dyno-mill, a dispermat, a SC mill, a spike mill, an agitator mill and the like, and media-less type dispersers such as an ultrasonic homogenizer, a high-pressure homogenizer, a nanomizer, a desolber, a disper, a high-speed impeller and the like.

Particularly, media type dispersers are preferably used from the viewpoint of costs and a processing capacity. One of them may be used alone, or two or more kinds of apparatuses may be used in combination.

(Dispersion Media)

Dispersion media can be appropriately selected from rigid spherical beads of stainless steel, steel and the like, ceramic beads of alumina, steatite, zirconia, zircon, silica, silicon carbide, silicon nitride and the like, glass beads of soda glass, HiBea and the like, and ultra-hard beads of WC and the like, and used, and the bead diameter is preferably in a range of 0.03 to 1.5 mm in diameter.

In a primary dispersion process for forming the metal complex into fine particles and dispersing the fine particles, the metal complex is loaded with a sufficient shearing force by means of collision of the metal complex and dispersion media and thus ground/dispersed to form the metal complex into fine particles. Herein, the temperature of a dispersion liquid rises due to energy from collision of the metal complex and dispersion media, and therefore it is preferable to carry out dispersion while cooling the dispersion liquid by a known cooler. The cooling temperature is not particularly limited, but is normally −50 to 120° C., preferably −30 to 80° C., further preferably −20 to 60° C.

(Dispersant)

A dispersant is blended as required for stably dispersing the metal complex in a dispersion medium. As the dispersant, for example, cationic dispersants such as an alkyl amine salt, a dialkyl amine salt, a tetraalkyl ammonium salt, a benzalkonium salt, an alkyl pyridinium salt, an imidazolium salt and the like, anionic dispersants such as a fatty acid salt, an alkyl sulfuric acid ester salt, an alkylaryl sulfonate, an alkylnaphthalene sulfonate, a dialkyl sulfonate, a dialkyl sulfosuccinate, an alkyldiaryl disulfonate, an alkyl phosphate and the like, amphoteric dispersants such as an alkyl betaine and an amide betaine and the like, nonionic dispersants, fluorine dispersants, silicon dispersants, polymer dispersants and the like can be used. Particularly, nonionic dispersants and polymer dispersants which are exemplified below are especially preferable.

As the nonionic dispersant, for example, polyoxyethylene alkyl ethers such as polyoxyethylene lauryl ether, polyoxyethylene cetyl ether, polyoxyethylene stearyl ether, polyoxyethylene oleyl ether and the like, polyoxyethylene alkylphenyl ethers such as polyoxyethylene octylphenyl ether, polyoxyethylene nonylphenyl ether and the like, polyethylene glycol diesters such as polyethylene glycol dilaurate, polyethylene glycol stearate and the like and sorbitan fatty acid esters are preferably used. From the viewpoint of dispersibility and economy, more preferable are polyoxyethylene alkyl ethers and polyoxyethylene alkylphenyl ethers.

As the polymer dispersant, for example, polyurethane, polycarboxylate, unsaturated polyamide, polycarboxylic acid and a salt thereof, a styrene-acrylic acid copolymer, an acrylic acid-acrylate copolymer, a styrene-maleic acid copolymer, a water-soluble resin and a water-soluble polymer compound such as polyvinyl alcohol, polyvinylpyrrolidone and the like, a polyester-based, a modified polyacrylate, an ethylene oxide/propylene oxide adduct and the like are preferably used.

These dispersants may be used alone or in combination of two or more kinds.

Dispersion with a dispersant provides for dispersion stabilization principally by two actions, i.e. "electrostatic repulsion" caused by an electrical repulsive force being given to fine particles by the dispersant adsorbed to the surfaces of fine particles and "steric repulsion" of the dispersants adsorbed to the surfaces of fine particles. Generally, the dispersion effect by electrostatic repulsion is advantageous for dispersion in an aqueous system, but is disadvantageous in an organic solvent system having a low dielectric constant. For the dispersion effect by steric repulsion, if an interaction between the surfaces of fine particles and the dispersant is insufficient, the dispersant is easily detached from the surfaces of fine particles, so that the stabilization effect is impaired to cause reaggregation.

The amount of the dispersant used is normally 5 to 100 parts by weight, preferably 10 to 60 parts by weight based on 100 parts by weight of the metal complex. If the amount of the dispersant used is less than 5 parts by weight, dispersion efficiency tends to decrease, and if the dispersant is added in an amount of more than 100 parts by weight, a dispersion effect appropriate for the added amount cannot be obtained, thus being uneconomical.

After obtaining a composition for an ultraviolet absorbent substance having fine particles of the metal complex dispersed in the manner described above, the composition may be diluted to a desired concentration.

A dilution solvent is not particularly limited, and can be appropriately selected and used, but a dispersion medium used in the dispersion process is preferably used for suppressing reaggregation of the metal complex fine particles during dilution. If two or more kinds of dispersion media are combined and used in the dispersion process, a mixed solvent having the same composition ratio is preferably used.

As a dilution method, preferable is a method of adding a dilution solvent while stirring a fine particle dispersion liquid of the metal complex. If the composition for an ultraviolet absorbent substance having fine particles of the metal complex dispersed therein is added in the dilution solvent, fine particles of the metal complex may be reaggregated.

A light absorbent which has been known can also be mixed with the metal complex and combined as required within the bounds of not impairing the effect of the present invention.

The light absorbents which can be combined are not particularly limited, and include, for example, organic pigments such as phthalocyanine-based, quinacridone-based, quinacridonequinone-based, benzimidazolon-based, quinone-based, anthanthrone-based, dioxazine-based, diketo-pyrrolopyrrole-based, anthanthrone-based, indanthrone-based, flavanthrone-based, perinone-based, perylene-based, isoindolin-based, isoindolinone-based, azo-based, cyanine-based, azacyanine-based, squarylium-based and triarylmethane-based pigments and the like, metal complex-based pigments such as benzenedithiol metal complex-based, dithiolene metal complex-based, azo metal-based, metal phthalocyanine-based, metal naphthalocyanine-based and porphyrin metal complex-based pigments and the like, and organic ultraviolet absorbents such as benzophenone-based, benzotriazole-based, triazine-based, salicylate-based, salicylic acid phenyl ester-based, hindered amine-based, hindered phenol-based, benzoate-based, phosphorus-based, amide-based, amine-based and sulfur-based ultraviolet absorbents and the like as organic light absorbents. From the viewpoint of economy and a light absorbing capability, preferable are organic pigments such as phthalocyanine-based, quinone-based, perylene-based, azo-based, cyanine-based, azacyanine-based, squarylium-based and triarylmethane-based pigments and the like, and organic ultraviolet absorbents such as benzophenone-based, benzotriazole-based, triazine-based, hindered amine-based, hindered phenol-based, benzoate-based, phosphorus-based, amine-based and sulfur-based ultraviolet absorbents and the like.

Examples of inorganic light absorbents include hexaborides, metal oxides such as tungsten oxide, composite tungsten oxide, titanium oxide, cerium oxide, zirconium oxide, tin oxide, zinc oxide, iron oxide, tantalum oxide, aluminum oxide, scandium oxide, yttrium oxide, calcium oxide, gallium oxide, lithium oxide, strontium oxide, barium oxide, magnesium oxide, indium oxide, thallium oxide, nickel oxide, neodymium oxide, cobalt oxide, chromium oxide, lanthanum oxide, niobium oxide, hafnium oxide, praseodymium oxide, samarium oxide, europium oxide, gadolinium oxide, terbium oxide, dysprosium oxide, holmium oxide, erbium oxide, thulium oxide, ytterbium oxide, lutetium oxide and the like, composite metal oxides such as ITO (indium-tin composite oxide), ATO (antimony-tin composite oxide) and the like, and metal nitrides such as titanium nitride, chromate nitride and the like.

A curing agent, a curing catalyst, a crosslinker, a coupling agent, a leveling agent, a lubricant, an antistatic agent, an antioxidant, a heat stabilizer, a fire retardant, a filler, a colorant, a photocatalyst material, a rust inhibitor, a water repellent, an electrically conductive material, an antiblocking material, a softener, a release agent, a fluorescent whitener and the like may be appropriately added within the bounds of not impairing the effect of the present invention.

If a polymerization process is provided for preparing the ultraviolet absorbent substance described later when a polymerizable monomer is used, a polymerization initiator may be specially combined. The polymerization initiator is not particularly limited, and can be appropriately selected according to the kind of polymerizable monomer used. The amount of polymerization initiator used can be appropriately selected according to the activities of a polymerizable monomer and a polymerization initiator.

Examples of radical polymerization initiators for use in heat curing may include azo compounds such as 2,2'-azobisisobutyronitrile, 2,2'-azobis(2-methylbutyronitrile), 2,2'-azobisisovaleronitrile, 2,2'-azobis(2,4-dimethylvaleronitrile), 1,1'-azobis(cyclohexanone-1-carbonitrile) and the like, ketone peroxides such as methyl ethyl ketone peroxide, methyl isobutyl ketone peroxide, cyclohexanone peroxide and the like, and diacyl peroxides such as benzoyl peroxide, lauroyl peroxide, 2,4-dichlorobenzoyl peroxide and the like.

Examples of radical polymerization initiators for use in light curing may include p-isopropyl-α-hydroxyisobutylphenone, α-hydroxyisobutylphenone, 2,2-dimethoxy-2-phenylacetophenone, 4'-methylthio-2,2-dimethyl-2-morpholinoacetophenone, benzoinisobutylether, 2-chlorothioxanthone, 2,4,6-trimethylbenzoyldiphenylphosphine oxide and bis(2,4,6-trimethylbenzoyl)-phenylphosphine oxide and the like.

Examples of cationic polymerization initiators for use in heat curing may include Lewis acids such as a boron trifluoride/diethyl ether complex, a boron trifluoride/amine complex, aluminum chloride, titanium tetrachloride, tin tetrachloride, iron chloride (III) and zinc chloride and the like, ammonium salts, sulfonium salts, oxonium salts, phosphonium salts and the like.

Examples of cationic polymerization initiators for use in light curing may include aromatic sulfonium salts, aromatic iodonium salts, aromatic diazonium salts and aromatic sulfonium salts and the like.

Examples of curing agents, which are used when an epoxy monomer is used as the polymerizable monomer, may include acid anhydrides such as phthalic anhydride, tetrahydrophthalic anhydride, hexahydrophthalic anhydride, trimellitic anhydride, pyromellitic anhydride, chlorendic anhydride, methyltetrahydrophthalic anhydride, methylhexahydrophthalic anhydride, dodecenylsuccinic anhydride, methylendomethylene tetrahydrophthalic anhydride and the like, aliphatic amines such as diethylenetriamine, triethylenediamine, triethylenetetramine, tetraethylenepentamine, diethylaminopropylamine, N-aminoethylpiperazine, isophoronediamine, mensendiamine, piperidine, N,N-dimethylpiperazine and the like, aromatic amines such as m-phenylenediamine, 4,4'-diaminodiphenylmethane, 4,4'-diaminodiphenylsulfone and the like, imidazoles such as 2-methylimidazole, 2-ethyl-4-methylimidazole and the like, Lewis acids such as a boron trifluoride/amine complex, aluminum chloride, titanium tetrachloride, tin tetrachloride, iron chloride (III), zinc chloride and the like, ammonium salts, sulfonium salts, oxonium salts, phosphonium salts, polymercaptan, polysulfide and the like.

Particularly, acid anhydrides are preferable from the viewpoint of improvement of mechanical properties of an epoxy resin after polymerization, and those which are liquid at ordinary temperature are preferable in terms of operability. Specifically, examples of the curing agents include methyltetrahydrophthalic anhydride, methylhexahydrophthalic anhydride, dodecenylsuccinic anhydride, methylendomethylene tetrahydrophthalic anhydride and the like.

In the case of use of an acid anhydride which is solid at ordinary temperature, for example, an acid anhydride such as phthalic anhydride, tetrahydrophthalic anhydride, hexahydrophthalic anhydride, methyltetrahydrophthalic anhydride or the like, the acid anhydride is preferably dissolved in an acid anhydride which is liquid at ordinary temperature, and used as a mixture which is liquid at ordinary temperature, in terms of operations.

For accelerating the curing reaction of an epoxy monomer, further a curing accelerator may also be used. The curing accelerator can be used alone or in mixture of two or more kinds. Examples of the curing accelerator include tertiary amines and imidazoles and/or organic carboxylates thereof such as 2-ethyl-4-methylimidazole, 2-methylimidazole, 1-cyanoethyl-2-ethyl-4-methylimidazole, benzyldimethylamine, 2,4,6-tris(diaminomethyl)phenol, 1,8-diazabiscyclo(5,4,0)undecene-7 and octylates thereof and the like, phosphines and/or quaternary salts thereof such as triphenylphosphine, tributylphosphine, benzyltriphenylphosphonium bromide, benzyltributylphosphonium bromide and the like, organic metal carboxylates such as zinc octylate, zinc laurate, zinc stearate, tin octylate and the like, metal-organic chelate compounds such as an acetylacetone zinc chelate, a benzoylacetone zinc chelate, a dibenzoylmethane zinc chelate, an ethyl acetoacetate zinc chelate composed of zinc and β-diketone and the like, and aromatic sulfonium salts.

A method may be employed in which a fine particle dispersion liquid of the metal complex is added and kneaded into a matrix material provided with fluidity by being melted by heating or the like.

<<Ultraviolet Absorbent Substance Prepared Using a Composition for an Ultraviolet Absorbent Substance>>

An ultraviolet absorbent substance can be prepared using the composition for an ultraviolet absorbent substance thus obtained. The ultraviolet absorbent substance in the present invention principally shows the following two forms.

(I) Ultraviolet Absorbent Substance as a Laminate Having on a Substrate a Film of a Matrix Material (Hereinafter Referred to as Matrix Film) Containing the Metal Complex An ultraviolet absorbent substance as a laminate having on a substrate a matrix film containing the metal complex can be prepared by coating on the substrate the composition for an ultraviolet absorbent substance obtained as described above and drying and/or curing the same.

Methods for coating the composition for an ultraviolet absorbent substance on a substrate are not particularly limited, but include known coating methods such as, for example, a dip coating method, a spin coating method, a flow coating method, a roll coating method, a gravure coating method, a flexographic printing method, a screen printing method, an inkjet printing method, a bar coating method, a spraying method, a reverse coating method and the like.

The substrate may be a film or a board as desired, and its shape is not limited. Also its material is not particularly limited, and can be appropriately selected according to the use application and used. Examples of the substrate include inorganic substrates such as glass, metal plate, ceramics and the like, and organic substrates such as a poly(cyclo)olefin resin, a polycarbonate resin, a (meth)acryl resin, a polyester resin, a polystyrene resin, an epoxy resin, a polyvinyl chloride resin, a polyvinylidene chloride resin, a polyacetal resin, a polyamide resin, a polyimide resin, a fluorine resin, a silicone resin, a polyslufone resin, a polyethersulfone resin, a polyetherketone resin, a polyetheretherketone resin, a polyphenylenesulfide resin and the like.

Particularly, from the viewpoint of transparency, preferable are glass, a poly(cyclo)olefin resin, a polycarbonate resin, a (meth)acryl resin, a polyester resin, a polystyrene resin, an epoxy resin, a polyvinyl chloride resin, a polyvinylidene chloride resin, a polyacetal resin, a polyamide resin, a polyimide resin, a polyslufone resin, a polyethersulfone resin, a polyetherketone resin, a polyetheretherketone resin and a polyphenylenesulfide resin.

The surface of the substrate may be cleaned before coating for the purpose of preventing inter-layer delamination and uneven coating. The cleaning method is not particularly limited, and can be appropriately selected according to the kind of the substrate and carried out. Normally, ultrasonic cleaning, UV cleaning, Seri powder cleaning, acid cleaning, alkali cleaning, surfactant cleaning, organic solvent cleaning and the like can be carried out alone or in combination. After completion of cleaning, rinsing and drying are carried out so that a cleaning agent does not remain.

The thickness of a coating film of a matrix material, which is formed by coating, is not particularly limited, and can be appropriately adjusted according to the use application, but is normally 0.1 to 500 µm, preferably 0.5 to 100 µm, further preferably 1 to 100 µm. If the thickness of the coating film is less than 0.1 µm, a satisfactory ultraviolet ray absorbing capability may not be obtained, and if the thickness of the coating film is more than 500 µm, a solvent, a dispersion medium and the like can be evaporated from the inside of the film during drying, resulting in generation of irregularities on the film surface and occurrence of cracks.

The drying temperature and drying time can be appropriately determined according to the kind of a solvent and a dispersion medium used.

After drying, an aging process and a baking process may be provided for controlling properties of a matrix film such as a mechanical strength and the like so as to satisfy the purpose.

For example, when a polysiloxane binder is used as a matrix material, the mechanical strength of the film itself can be improved by providing a baking process at 100 to 800° C., preferably 130 to 400° C. after the drying process.

That is, in the drying process, sols (siloxane oligomers) undergo a polycondensation reaction with one another to expand a siloxane network and form a backbone structure of a gel. By baking the gel, the siloxane network is further expanded. The mechanical strength of the matrix film obtained can be controlled by the size of the siloxane network (molecular weight of polysiloxane).

The mechanical strength may not be satisfactorily improved if the baking temperature is lower than 100° C., and the metal complex contained in the matrix film may be thermally decomposed if the baking temperature is higher than 800° C.

The baking time can be appropriately adjusted according to the desired properties of the matrix film, but is normally 10 minutes to 5 hours, preferably 30 minutes to 3 hours. The mechanical strength may not be satisfactorily improved if the baking time is shorter than 10 minutes, and if the baking time is longer than 5 hours, an effect appropriate for the time cannot be obtained, thus being uneconomical.

If a polymerization process is provided, processes such as a heating process, UV irradiation and the like can be provided. Heating conditions and UV irradiation conditions can be appropriately selected according to the types of a polymerization initiator and a polymerizable monomer used.

A laminate obtained by using the releasable substrate, applying a coating onto the substrate, and then transferring the coating layer to a desired different substrate is also included in aspect (I). As the different substrate, the aforementioned substrates are exemplified.

As a specific method, for example, a composition for an ultraviolet absorbent substance is coated on a releasable substrate (e.g. a polyethylene terephthalate film) and dried, then thereto is laminated a different substrate (e.g. a glass substrate) using a laminator or the like, and the releasable substrate is separated, whereby an ultraviolet absorbent substance as a laminate having on the different substrate a matrix film containing the metal complex can be prepared. In this case, the polymerization process may be provided as required.

For example, when a laminate, in which matrix films including different components are multi-layered on a desired substrate, are prepared, such a transfer method can be used. That is, when a multi-layered film is to be formed by a method of coating a composition for an ultraviolet absorbent substance directly on a substrate to form a coating layer as described above, for example, a composition for an ultraviolet absorbent substance which is used for forming the (n+1)th layer (n represents a natural number) must be such that constituents of the nth layer are not dissolved or swollen, and constituents of the composition for an ultraviolet absorbent substance which constitutes the (n+1)th layer are thus limited, but by using such a transfer method, these limitations can be avoided.

(II) Ultraviolet Absorbent Substance in a Thin Film Form with the Metal Complex Contained in a Matrix Film.

An ultraviolet absorbent substance in a thin film form with the metal complex contained in a matrix film, which is obtained by coating on a releasable substrate the composition for an ultraviolet absorbent substance obtained as described above, and drying or curing the coating film, and then separating the coating film from the releasable substrate, can be prepared.

Methods for coating a composition for an ultraviolet absorbent substance on a releasable substrate are not particularly limited, and include known coating methods such as, for example, a dip coating method, a spin coating method, a flow coating method, a roll coating method, a gravure coating method, a flexographic printing method, a screen printing method, an inkjet printing method, a bar coating method, a spraying method, a reverse coating method and the like.

The releasable substrate may be a film or a board as desired, and its shape is not limited. The releasable substrate may be a substrate alone if a raw material constituting a substrate has releasability, or may be a laminate obtained by providing a releasable layer on a substrate if a raw material constituting a substrate has no releasability or poor releasability. In the former case where a raw material constituting a substrate has releasability, a polyolefin resin such as a polyethylene resin, a polypropylene resin or the like, a polyester resin such as a polyethylene terephthalate resin or the like can be used.

In the latter case of a laminate obtained by providing a releasable layer on a substrate, the substrate exemplified in (I) above can be used as a substrate. A laminate obtained by providing on the surface of the substrate a releasable layer having adhesiveness to the substrate and releasability to a thin film layer containing the metal complex, which is prepared from a composition for an ultraviolet absorbent substance.

The releasable layer is composed of a fluorine resin, a silicone resin, a releasable substance dissolved or dispersed in a binder resin, or the like.

Releasable substances are not particularly limited, and include, for example, long-chain alkyl compounds and synthetic waxes such as carnauba wax, montan wax, oxidized polyethylene, non-oxidized polyethylene and the like.

By dissolving, dispersing and diluting at least one selected from the above-mentioned substances in a solvent (dispersion medium), and coating or printing the obtained composition on a substrate by a known method, followed by drying or curing, a releasable layer can be formed on the substrate. The thickness of the releasable layer is preferably about 0.5 μm to 10 μm.

The thickness of a thin film with the metal complex contained in a matrix film, which is formed by coating a composition for an ultraviolet absorbent substance on a releasable substrate, is not particularly limited, and can be appropriately adjusted according to the use application, but is normally 0.1 to 500 μm, preferably 0.5 to 100 μm, further preferably 1 to 100 μm. If the thickness of the coating film is less than 0.1 μm, a satisfactory ultraviolet ray absorbing capability may not be obtained, and if the thickness of the coating film is more than 500 μm, a solvent, a dispersion medium and the like can be evaporated from the inside of the film, resulting in generation of irregularities on the film surface and occurrence of cracks.

The drying temperature and drying time can be appropriately determined according to the kind of a solvent, a dispersion medium and the like which are used.

After drying, an aging process and a baking process may be provided for controlling properties of a thin film containing the metal complex such as a mechanical strength and the like so as to satisfy the purpose.

For example, when a polysiloxane binder is used as a matrix material, the mechanical strength of the film itself can be improved by providing a baking process at 100 to 800° C., preferably 130 to 400° C. after the drying process.

That is, in the drying process, sols (siloxane oligomers) undergo a polycondensation reaction with one another to expand a siloxane network and form a backbone structure of a gel. By baking the gel, the siloxane network is further expanded. The mechanical strength of the matrix film obtained can be controlled by the size of the siloxane network (molecular weight of polysiloxane).

The mechanical strength may not be satisfactorily improved if the baking temperature is lower than 100° C., and the metal complex contained in the matrix film may be thermally decomposed if the baking temperature is higher than 800° C.

The baking time can be appropriately adjusted according to the desired properties of the thin film, but is normally 10 minutes to 5 hours, preferably 30 minutes to 3 hours. The mechanical strength may not be satisfactorily improved if the baking time is shorter than 10 minutes, and if the baking time is longer than 5 hours, an effect appropriate for the time cannot be obtained, thus being uneconomical.

If a polymerization process is provided, processes such as a heating process, UV irradiation and the like can be provided. Heating conditions and UV irradiation conditions can be appropriately selected according to the types of a polymerization initiator and a polymerizable monomer used.

EXAMPLES

Hereinbelow, the present invention will be specifically described with Examples and Comparative Examples, but the present invention is in no way limited to these Examples.

Production Example 1

Phenol (18.8 g (0.2 mol)) was heated to 50° C. and melted, thereto was added 45.1 g (0.3 mol) of 2-aminobenzothiazole, and the resulting mixture was then further heated to 180° C. and maintained at the same temperature for 20 hours. Thereafter, the reaction liquid was cooled to 80° C., 60 g of ethanol was added dropwise, and the resulting mixture was further maintained at the same temperature for an hour. Thereafter, the mixture was cooled to room temperature, and a precipitate was filtered off, washed with ethanol, and dried to obtain 32.1 g of white 2,2'-iminobisbenzothiazole (L1: see Table 1 below) as a ligand. The yield was 75.5% based on 2-aminobenzothiazole.

Production Example 2

In a manner similar to that in Production Example 1 except that 53.5 g (0.3 mol) of 2-amino-5,6-dimethylbenzothiazole was used in place of 45.1 g (0.3 mol) of 2-aminobenzothiazole in Production Example 1, 42.1 g of white 2,2'-iminobis (5,6-dimethylbenzothiazole) (L2: see Table 1 below) was obtained as a ligand. The yield was 82.7% based on 2-amino-5,6-dimethylbenzothiazole.

Production Example 3

In a manner similar to that in Production Example 1 except that 55.4 g (0.3 mol) of 2-amino-6-chlorobenzothiazole was used in place of 45.1 g (0.3 mol) of 2-aminobenzothiazole in Production Example 1, 37.2 g of white 2,2'-iminobis(6-chlorobenzothiazole) (L3: see Table 1 below) was obtained as a ligand. The yield was 70.4% based on 2-amino-6-chlorobenzothiazole.

Production Example 4

In a manner similar to that in Production Example 1 except that 54.1 g (0.3 mol) of 2-amino-6-methoxybenzothiazole was used in place of 45.1 g (0.3 mol) of 2-aminobenzothiazole in Production Example 1, 41.7 g of white 2,2'-iminobis(6-methoxybenzothiazole) (L4: see Table 1 below) was obtained as a ligand. The yield was 81.0% based on 2-amino-6-methoxybenzothiazole.

Production Example 5

2-aminobenzothiazole (90.1 g (0.60 mol)) was dissolved in 566 g of DMF, 36 mL of 20 mol/L aqueous sodium hydroxide solution (equivalent to 0.72 mol of sodium hydroxide) was added dropwise under an ice bath, 91.4 g (1.2 mol) of carbon disulfide was then added dropwise, 36 mL of 20 mol/L aqueous sodium hydroxide solution (equivalent to 0.72 mol of sodium hydroxide) was further added dropwise, and 178.8 g (1.26 mol) of methyl iodide was then added dropwise. The resulting mixture was stirred at room temperature for 2 hours, and the reaction liquid was added dropwise in 3000 g of water. A precipitate was filtered off, washed with water, and dried to obtain 107.2 g of S,S'-dimethyl-N-(2-benzothiazolyl)carbonimidodithioate. The yield was 70.2% based on 2-aminobenzothiazole.

2-aminophenol (21.8 g (0.20 mol)) was dissolved in 944 g of DMF, thereto was added 40 mL of 5 mol/L aqueous sodium hydroxide solution (equivalent to 0.20 mol of sodium hydroxide), the resulting mixture was stirred at room temperature for 30 minutes, and then thereto was added a solution obtained by dissolving 50.9 g (0.20 mol) of the obtained S,S'-dimethyl-N-(2-benzothiazolyl)carbonimidodithioate in 1416 g of DMF. The resulting mixture was then heated to 153° C., refluxed under a nitrogen atmosphere for 6 hours, and then cooled to room temperature, and the reaction liquid was added dropwise in 2000 g of water. A precipitate was filtered off, washed with water, and dried to obtain 30.0 g of 2-(2-benzothiazolylamino)benzoxazole (L5: see Table 1 below). The yield was 56.1% based on 2-aminophenol.

Production Example 6

In a manner similar to that in Production Example 5 except that 98.5 g (0.60 mol) of 2-amino-6-methylbenzothiazole was used in place of 90.1 g (0.60 mol) of 2-aminobenzothiazole in Production Example 5, 114.2 g of S'S-dimethyl-N-[2-(6-methylbenzothiazolyl)]carbonimidodithioate was obtained. The yield was 70.9% based on 2-amino-6-methylbenzothiazole.

In a manner similar to that in Production Example 5 except that 53.7 g (0.20 mol) of S,S'-dimethyl-N-[2-(6-methylbenzothiazolyl)]carbonimidodithioate obtained here was used in place of 50.9 g (0.20 mol) of S,S'-dimethyl-N-(2-benzothiazolyl) carbonimidodithioate in Production Example 5, 29.4 g of 2-[2-(6-methylbenzothiazolyl)amino]benzoxazole (L6: see Table 1 below) was obtained. The yield was 52.3% based on S,S'-dimethyl-N-[2-(6-methylbenzothiazolyl)]carbonimidodithioate.

Production Example 7

In a manner similar to that in Production Example 5 except that 28.7 g (0.20 mol) of 2-amino-4-chlorophenol was used in place of 21.8 g (0.20 mol) of 2-aminophenol in Production Example 5, 32.4 g of 5-chloro-2-(2-benzothiazolylamino)benzoxazole (L7: see Table 1 below) was obtained. The yield was 53.7% based on 2-amino-4-chlorophenol.

Production Example 8

O-phenylenediamine (21.6 g (0.2 mol)) was dissolved in 944 g of DMF, and thereto was added dropwise a solution obtained by dissolving 50.9 g (0.20 mol) of S,S'-dimethyl-N-(2-benzothiazolyl)-carbonimidodithioate in 1258 g of DMF. The resulting mixture was then heated to 153° C., refluxed under a nitrogen atmosphere for 13 hours, and then cooled to 0° C. Thereto was added dropwise 2000 g of water, and a precipitate was filtered off, washed with water, and dried to obtain 32.0 g of 2-(2-benzothiazolylamino)benzoimidazole (L8: see Table 1 below). The yield was 60.1% based on o-phenylenediamine.

Production Example 9

Ethylcyano acetate (101.8 g (0.90 mol)) and 112.7 g (0.90 mol) of 2-aminothiophenol were mixed, and the resulting mixture was kept at 120° C. under a nitrogen atmosphere for 2 hours. After the reaction liquid was cooled to room temperature, 185.7 g of ethyl-2-benzothiazolyl acetate was obtained as a yellow oil. The yield was 93.2% based on 2-aminothiophenol.

N-methyl-o-phenylenediamine (73.3 g (0.60 mol)) and 132.8 g (0.60 mol) of the obtained ethyl-2-benzothiazolyl acetate were mixed, and the resulting mixture was refluxed under a nitrogen atmosphere at 160° C. for 6 hours. Reflux was carried out while distilling away ethanol produced as a byproduct at this time. The reaction liquid was cooled to room temperature, 900 g of diethyl ether was added, and a yellow solid precipitated was filtered off. To the filtered yellow solid, 1500 g of 20% hydrochloric acid was added to dissolve the solid. Thereto was added activated carbon, the resulting mixture was stirred at room temperature for 30 minutes, and then filtered, an aqueous sodium hydrogen carbonate solution was added dropwise to neutralize the mixture until the obtained filtrate reached pH=8, and resultantly a precipitate was obtained. The precipitate was filtered off, 600 g of water and 600 g of chloroform were added, the resulting mixture was stirred and a chloroform layer was taken out by liquid separation processing. Chloroform was distilled away, and further dried to obtain 36.9 g of pale yellow (2-benzothiazolyl)(2-N-methylbenzimidazolyl)methane (L9: see table 1 below). The yield was 22.0% based on N-methyl-o-phenylenediamine.

Production Example 10

2-aminophenol (32.7 g (0.30 mol)) and 15.6 g (0.15 mol) of malonic acid were mixed, and the mixed liquid was added in 390 g of polyphosphoric acid under stirring while being kept at 70° C. Next, the reaction liquid was heated to 150° C., maintained at the same temperature for 3 hours, and then cooled to room temperature, and water was then added dropwise. A precipitate was filtered off, washed with water, and dried to obtain 25.3 g of bis(2-benzoxazolyl)methane (L10: see Table 1 below). The yield was 67.4% based on 2-aminophenol.

Production Example 11

In a manner similar to that in Production Example 10 except that 37.6 g (0.30 mol) of 2-aminothiophenol was used in place of 32.7 g (0.30 mol) of 2-aminophenol in Production Example 10, 38.2 g of bis(2-benzothiazolyl)methane (L11: see Table 1 below) was obtained. The yield was 90.2% based on 2-aminothiophenol.

Production Example 12

N-methyl-o-phenylenediamine (110.0 g (0.90 mol)) and 72.1 g (0.45 mol) of diethyl malonate were mixed, and the mixed liquid was refluxed under a nitrogen atmosphere at 155° C. for 11 hours. A precipitate was filtered off, and washed with diethyl ether, and 900 mL of 20% hydrochloric acid was then added to dissolve the precipitate. Thereto was added activated carbon, the resulting mixture was stirred at room temperature for 30 minutes, and then filtered, an aqueous sodium hydrogen carbonate solution was added dropwise until the obtained filtrate reached pH=8, and resultantly a precipitate was generated. The precipitate was filtered off to obtain a gray solid. The gray solid was refined by recrystallization from IPA, and dried to obtain 38.1 g of white bis[2-(N-methylbenzimidazolyl)]methane (L12: see Table 1 below). The yield was 30.6% based on N-methyl-o-phenylenediamine.

Production Example 13

2,2'-iminobisbenzothiazole (L1: see Table 1 below) (10 g (0.035 mol)) obtained in Production Example 1 was added to 70.1 g (0.602 mol) of chlorosulfonic acid, and the mixture was stirred at room temperature for 18 hours. Further 10 g (0.084 mol) of thionyl chloride was added, and the resulting mixture was stirred at 50° C. for an hour, and then cooled to room temperature. The mixture was poured onto 400 g of ice, subjected to suction filtration, and immediately stirred with 13.1 g (0.101 mol) of diisobutylamine together with remaining ice. The mixture was warmed to room temperature, and then made alkaline by about 1 mL of 50 wt % aqueous sodium hydroxide solution. The solid was subjected to suction filtration, washed with water, and dried to obtain 18.6 g of 2,2'-iminobis[6-(N,N-diisobutylaminosulfonyl)benzothiazole] (L13: see Table 1 below). The yield was 80.0% based on 2,2'-iminobisbenzothiazole.

Production Example 14

In a manner similar to that in Production Example 13 except that 8.8 g (0.101 mol) of morpholine was used in place of 13.1 g (0.101 mol) of diisobutylamine in Production Example 13, 15.4 g of 2,2'-iminobis(6-morpholinosulfonylbenzothiazole) (L14: see Table 1 below) was obtained. The yield was 75.5% based on 2,2'-iminobisbenzothiazole.

The structures of the obtained ligands are shown in Table 1.

TABLE 1

| | Ligands Formula (2) | Structural formulae |
|---|---|---|
| Production Example 1 | L1 | |
| Production Example 2 | L2 | |
| Production Example 3 | L3 | |
| Production Example 4 | L4 | |
| Production Example 5 | L5 | |
| Production Example 6 | L6 | |

TABLE 1-continued

| | Ligands Formula (2) | Structural formulae |
|---|---|---|
| Production Example 7 | L7 | |
| Production Example 8 | L8 | |
| Production Example 9 | L9 | |
| Production Example 10 | L10 | |
| Production Example 11 | L11 | |
| Production Example 12 | L12 | |
| Production Example 13 | L13 | |
| Production Example 14 | L14 | |

Production Example 15

Ligand (L1) (28.3 g (0.1 mol)) obtained in Production Example 1 was dissolved in 2250 g of warm methanol (60° C.), and thereto was added dropwise a solution obtained by dissolving 12.5 g (0.05 mol) of cobalt acetate tetrahydrate in 400 g of warm methanol. The resulting precipitate was filtered off, washed with methanol, and then dried to obtain 28.5 g of orange cobalt complex (C1-Co). The yield was 91.4% based on the ligand (L1).

Production Example 16

In a manner similar to that in Production Example 15 except that 12.4 g (0.05 mol) of nickel acetate tetrahydrate was used in place of 12.5 g (0.05 mol) of cobalt acetate tetrahydrate in Production Example 15, 23.5 g of reddish violet nickel complex (C1-NU was obtained. The yield was 75.4% based on the ligand (L1).

Production Example 17

In a manner similar to that in Production Example 15 except that 10.0 g (0.05 mol) of copper acetate monohydrate was used in place of 12.5 g (0.05 mol) of cobalt acetate tetrahydrate in Production Example 15, 24.8 g of greenish gray copper complex (C1-Cu) was obtained. The yield was 78.9% based on the ligand (L1).

Production Example 18

In a manner similar to that in Production Example 15 except that 11.0 g (0.05 mol) of zinc acetate dihydrate was used in place of 12.5 g (0.05 mol) of cobalt acetate tetrahydrate in Production Example 15, 28.4 g of white zinc complex (C1-Zn) was obtained. The yield was 90.1% based on the ligand (L1).

Production Example 19

In a manner similar to that in Production Example 15 except that 33.9 g (0.1 mol) of ligand (L2) was used in place of 28.3 g (0.1 mol) of ligand (L1) in Production Example 15, 32.3 g of orange cobalt complex (C2-Co) was obtained. The yield was 87.8% based on the ligand (L2).

Production Example 20

In a manner similar to that in Production Example 16 except that 35.2 g (0.1 mol) of ligand (L3) was used in place of 28.3 g (0.1 mol) of ligand (L1) in Production Example 16, 28.0 g of reddish violet nickel complex (C3-Ni) was obtained. The yield was 73.6% based on the ligand (L3).

Production Example 21

In a manner similar to that in Production Example 17 except that 34.3 g (0.1 mol) of ligand (L4) was used in place of 28.3 g (0.1 mol) of ligand (L1) in Production Example 17, 26.2 g of greenish gray copper complex (C4-Cu) was obtained. The yield was 70.0% based on the ligand (L4).

Production Example 22

In a manner similar to that in Production Example 18 except that 26.7 g (0.1 mol) of ligand (L5) was used in place of 28.3 g (0.1 mol) of ligand (L1) in Production Example 18, 20.8 g of pale yellow zinc complex (C5-Zn) was obtained. The yield was 69.6% based on the ligand (L5).

Production Example 23

In a manner similar to that in Production Example 15 except that 28.1 g (0.1 mol) of ligand (L6) was used in place of 28.3 g (0.1 mol) of ligand (L1) in Production Example 15, 16.3 g of orange cobalt complex (C6-Co) was obtained. The yield was 52.6% based on the ligand (L6).

Production Example 24

In a manner similar to that in Production Example 16 except that 30.2 g (0.1 mol) of ligand (L7) was used in place of 28.3 g (0.1 mol) of ligand (L1) in Production Example 16, 22.5 g of reddish violet nickel complex (C7-Ni) was obtained. The yield was 68.2% based on the ligand (L7).

Production Example 25

In a manner similar to that in Production Example 17 except that 26.6 g (0.1 mol) of ligand (L8) was used in place of 28.3 g (0.1 mol) of ligand (L1) in Production Example 17, 16.6 g of green copper complex (C8-Cu) was obtained. The yield was 55.9% based on the ligand (L8).

Production Example 26

In a manner similar to that in Production Example 18 except that 27.9 g (0.1 mol) of ligand (L9) was used in place of 28.3 g (0.1 mol) of ligand (L1) in Production Example 18, 21.1 g of yellow zinc complex (C9-Zn) was obtained. The yield was 67.8% based on the ligand (L9).

Production Example 27

In a manner similar to that in Production Example 15 except that 25.0 g (0.1 mol) of ligand (L10) was used in place of 28.3 g (0.1 mol) of ligand (L1) in Production Example 15, 20.3 g of red cobalt complex (C10-Co) was obtained. The yield was 72.8% based on the ligand (L10).

Production Example 28

In a manner similar to that in Production Example 15 except that 28.2 g (0.1 mol) of ligand (L11) was used in place of 28.3 g (0.1 mol) of ligand (L1) in Production Example 15, 22.1 g of violet cobalt complex (C11-Co) was obtained. The yield was 71.1% based on the ligand (L11).

Production Example 29

In a manner similar to that in Production Example 16 except that 28.2 g (0.1 mol) of ligand (L11) was used in place of 28.3 g (0.1 mol) of ligand (L1) in Production Example 16, 13.5 g of greenish black nickel complex (C11-Ni) was obtained. The yield was 43.4% based on the ligand (L11).

Production Example 30

In a manner similar to that in Production Example 17 except that 28.2 g (0.1 mol) of ligand (L11) was used in place of 28.3 g (0.1 mol) of ligand (L1) in Production Example 17, 18.6 g of green copper complex (C11-Cu) was obtained. The yield was 59.4% based on the ligand (L11).

Production Example 31

In a manner similar to that in Production Example 18 except that 28.2 g (0.1 mol) of ligand (L11) was used in place of 28.3 g (0.1 mol) of ligand (L1) in Production Example 18, 19.1 g of yellow zinc complex (C11-Zn) was obtained. The yield was 60.8% based on the ligand (L11).

Production Example 32

In a manner similar to that in Production Example 16 except that 27.6 g (0.1 mol) of ligand (L12) was used in place of 28.3 g (0.1 mol) of ligand (L1) in Production Example 16, 20.8 g of gray nickel complex (C12-Ni) was obtained. The yield was 68.3% based on the ligand (L12).

Production Example 33

Ligand (L13) (4.00 g (0.006 mol)) obtained in Production Example 13 was dissolved in 24 g of warm DMF (70° C.), and thereto was added 0.75 g (0.003 mol) of nickel acetate tetrahydrate. The mixture was stirred at 70° C. for an hour, and cooled to room temperature, and 20 g of methanol was then added dropwise. The resulting precipitate was filtered off, washed with methanol, and then dried to obtain 3.58 g of yellowish green nickel complex (C13-Ni). The yield was 85.9% based on the ligand (L13).

Production Example 34

Ligand (L14) (3.49 g (0.006 mol)) obtained in Production Example 14 was dissolved in 24 g of warm DMF (70° C.), and thereto was added 0.75 g (0.003 mol) of cobalt acetate tetrahydrate. The mixture was stirred at 70° C. for an hour, and cooled to room temperature, and 20 g of methanol was then added dropwise. The resulting precipitate was filtered off, washed with methanol, and then dried to obtain 3.14 g of yellow cobalt complex (C14-Co). The yield was 85.8% based on the ligand (L14).

The structural formulae of the obtained metal complexes are shown in Table 2.

TABLE 2

| | Metal complexes Formula (1) | Ligands Formula (2) |
|---|---|---|
| Production Example 15 | C1-Co | L1 |
| Production Example 16 | C1-Ni | L1 |
| Production Example 17 | C1-Cu | L1 |
| Production Example 18 | C1-Zn | L1 |
| Production Example 19 | C2-Co | L2 |
| Production Example 20 | C3-Ni | L3 |
| Production Example 21 | C4-Cu | L4 |
| Production Example 22 | C5-Zn | L5 |
| Production Example 23 | C6-Co | L6 |
| Production Example 24 | C7-Ni | L7 |
| Production Example 25 | C8-Cu | L8 |
| Production Example 26 | C9-Zn | L9 |
| Production Example 27 | C10-Co | L10 |
| Production Example 28 | C11-Co | L11 |
| Production Example 29 | C11-Ni | L11 |
| Production Example 30 | C11-Cu | L11 |
| Production Example 31 | C11-Zn | L11 |
| Production Example 32 | C12-Ni | L12 |
| Production Example 33 | C13-Ni | L13 |
| Production Example 34 | C14-Co | L14 |

(Preparation of Sol Solution of Inorganic Binder: Silicon Alkoxide)

The heated residue of a sol solution of silicon alkoxide described below is a value obtained by dividing the weight of a solid, which remains on a glass substrate after baking at 200° C. for 30 minutes a droplet of a sol solution placed on a glass substrate, by the weight of the droplet of the sol solution placed on the glass substrate. Measurements were made three times for each sample, and an average of the obtained values was shown.

Production Example 35

Methyltriethoxysilane (49.9 g (0.28 mol)), 24.0 g (0.10 mol) of phenyltriethoxysilane and 80 g of PGMEA were mixed, and the resulting mixture was stirred at room temperature to obtain a solution. To the solution was added 6.9 g (0.15 mol) of formic acid as a catalyst and 25.0 g of water, and the resulting mixture stirred at room temperature for 30 minutes to perform hydrolysis. Next, the solution after hydrolysis was heated to 70° C., and maintained at the same temperature for 4 hours, a hydrolysis/polycondensation reaction was allowed to proceed, and the hydrolysis/polycondensation reaction was allowed to further proceed for an hour while distilling away an alcohol produced as a byproduct and water to obtain a sol of silicon alkoxide/PGMEA solution (siloxane oligomer/PGMEA solution, heated residue 40.5%) as an inorganic binder: polysiloxane binder precursor.

Production Example 36

In a manner similar to that in Production Example 35 except that 80 g of IPA was used in place of 80 g of PGMEA in Production Example 35, a sol of silicon alkoxide/IPA solution (siloxane oligomer/IPA solution, heated residue 41.7%) as an inorganic binder: polysiloxane binder precursor was obtained.

Production Example 37

In a manner similar to that in Production Example 35 except that 80 g of DMF was used in place of 80 g of PGMEA in Production Example 35, a sol of silicon alkoxide/DMF solution (siloxane oligomer/DMF solution, heated residue 45.3%) as an inorganic binder: polysiloxane binder precursor was obtained.

(Preparation of Metal Complex Fine Particle Dispersion Liquid)

The average particle diameter shows a value of Z-Average size measured by a general particle size analyzer, for example a dynamic light scattering particle size analyzer (e.g. "Zetasizer Nano ZS" manufactured by Sysmex Corporation).

The average particle diameters shown below were measured under the conditions of light source: He—Ne laser (633 nm), cell: square glass cell, measurement temperature: 25° C. and measure position: 0.85 (mm) using "Zetasizer Nano ZS" manufactured by Sysmex Corporation. Measurements were made three times for each sample, and an average of the obtained values was shown.

Production Example 38

The metal complex (C1-Co) (11.1 g) obtained in Production Example 15, 58.5 g of PGMEA as a dispersion medium, and 3.0 g of polyoxyethylene lauryl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid A. The average particle diameter was 88 nm.

Production Example 39

The metal complex (C1-NU (11.1 g) obtained in Production Example 16, 58.0 g of PGMEA as a dispersion medium, and 3.0 g of polyoxyethylene oleyl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid B. The average particle diameter was 95 nm.

Production Example 40

The metal complex (C1-Cu) (11.1 g) obtained in Production Example 17, 30.0 g of ethanol and 30.0 g of water as a dispersion medium, and 3.0 g of polyoxyethylene stearyl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid C. The average particle diameter was 85 nm.

Production Example 41

The metal complex (C1-Zn) (11.1 g) obtained in Production Example 18, 30.0 g of ethanol and 30.0 g of water as a dispersion medium, and 3.0 g of polyoxyethylene octylphenyl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid D. The average particle diameter was 68 nm.

Production Example 42

The metal complex (C1-Co) (11.1 g) obtained in Production Example 15, 70.2 g of toluene as a dispersion medium, and 3.5 g of polyoxyethylene nonylphenyl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid E. The average particle diameter was 70 nm.

Production Example 43

The metal complex (C1-NU (11.1 g) obtained in Production Example 16, 70.2 g of toluene as a dispersion medium, and 3.5 g of polyethylene glycol dilaurate as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid F. The average particle diameter was 77 nm.

Production Example 44

The metal complex (C1-Cu) (11.1 g) obtained in Production Example 17, 70.2 g of toluene as a dispersion medium, and 3.5 g of polyethylene glycol distearate as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid G. The average particle diameter was 69 nm.

Production Example 45

The metal complex (C1-Zn) (11.1 g) obtained in Production Example 18, 70.2 g of toluene as a dispersion medium, and 3.5 g of polyoxyethylene lauryl ether as a dispersant were mixed, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a dispersion liquid H. The average particle diameter was 73 nm.

Composition for Ultraviolet Absorbent Substance and Ultraviolet Absorbent Substance Comprising the Composition Example 1

PGMEA (0.7 g) was added to 2.0 g of siloxane oligomer/PGMEA solution obtained in Production Example 35, and mixed. The resulting mixture was then added to 0.6 g of metal complex fine particle dispersion liquid (dispersion liquid A) obtained in Production Example 38 with stirring and mixed to thereby obtain a composition A for an ultraviolet absorbent substance in a dispersion liquid form. The average particle diameter was 92 nm.

The obtained composition A for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance A. The thickness of the coating film was 12 μm.

Example 2

PGMEA (0.7 g) was added to 2.0 g of siloxane oligomer/PGMEA solution obtained in Production Example 35, and mixed. The resulting mixture was then added to 0.6 g of metal complex fine particle dispersion liquid (dispersion liquid B) obtained in Production Example 39 with stirring and mixed to thereby obtain a composition B for an ultraviolet absorbent substance in a dispersion liquid form. The average particle diameter was 98 nm.

The obtained composition B for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance B. The thickness of the coating film was 13 μm.

Example 3

IPA (0.8 g) was added to 2.0 g of siloxane oligomer/IPA solution obtained in Production Example 36, and mixed. The resulting mixture was then added to 0.8 g of metal complex fine particle dispersion liquid (dispersion liquid C) obtained in Production Example 40 with stirring and mixed to thereby obtain a composition C for an ultraviolet absorbent substance in a dispersion liquid form. The average particle diameter was 95 nm.

The obtained composition C for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance C. The thickness of the coating film was 13 μm.

Example 4

IPA (0.8 g) was added to 2.0 g of siloxane oligomer/IPA solution obtained in Production Example 36, and mixed. The resulting mixture was then added to 0.5 g of metal complex fine particle dispersion liquid (dispersion liquid D) obtained in Production Example 41 with stirring and mixed to thereby obtain a composition D for an ultraviolet absorbent substance in a dispersion liquid form. The average particle diameter was 72 nm.

The obtained composition D for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance D. The thickness of the coating film was 9 μm.

Example 5

Methyl acrylate-ethyl methacrylate copolymer (product name: Paraloid B-72 manufactured by Rohm & Hass Co.) (0.8 g) as an organic binder was dissolved in 1.7 g of toluene, and the resulting solution was added to 0.6 g of metal complex fine particle dispersion liquid (dispersion liquid E) obtained in Production Example 42 with stirring, and mixed to thereby obtain a composition E for an ultraviolet absorbent substance in a dispersion liquid form. The average particle diameter was 78 nm.

The obtained composition E for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance E. The thickness of the coating film was 13 μm.

Example 6

Methyl acrylate-ethyl methacrylate copolymer (product name: Paraloid B-72 manufactured by Rohm & Hass Co.) (0.8 g) as an organic binder was dissolved in 1.7 g of toluene, and the resulting solution was added to 0.6 g of metal complex fine particle dispersion liquid (dispersion liquid F) obtained in Production Example 43 with stirring, and mixed to thereby obtain a composition F for an ultraviolet absorbent substance in a dispersion liquid form. The average particle diameter was 80 nm.

The obtained composition F for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance F. The thickness of the coating film was 10 μm.

Example 7

Methyl acrylate-ethyl methacrylate copolymer (product name: Paraloid B-72 manufactured by Rohm & Hass Co.) (0.8 g) as an organic binder was dissolved in 1.7 g of toluene, and the resulting solution was added to 0.8 g of metal complex fine particle dispersion liquid (dispersion liquid G) obtained in Production Example 44 with stirring, and mixed to thereby obtain a composition G for an ultraviolet absorbent substance in a dispersion liquid form. The average particle diameter was 75 nm.

The obtained composition G for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance G. The thickness of the coating film was 11 μm.

Example 8

Methyl acrylate-ethyl methacrylate copolymer (product name: Paraloid B-72 manufactured by Rohm & Hass Co.) (0.8 g) as an organic binder was dissolved in 1.7 g of toluene, and the resulting solution was added to 0.5 g of metal complex fine particle dispersion liquid (dispersion liquid H) obtained in Production Example 45 with stirring, and mixed to thereby obtain a composition H for an ultraviolet absorbent substance in a dispersion liquid form. The average particle diameter was 81 nm.

The obtained composition H for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance H. The thickness of the coating film was 10 μm.

Example 9

Metal complex (C3-Ni) (2.2 g) obtained in Production Example 20, 60.1 g of toluene as a dispersion medium, 21.9 g of methyl acrylate-ethyl methacrylate copolymer (product name: Paraloid B-72 manufactured by Rohm & Hass Co.) as an organic binder, and 0.68 g of polyoxyetylene octylphenyl ether as a dispersant were mixed, and the resulting mixture was subjected to dispersion processing at a circumferential speed of 15 m/s for 2 hours using 0.3 mm-diameter zirconia beads as dispersion media and DYNO-MILL (manufactured by Shinmaru Enterprises Corporation; Model: KDL) as a disperser while keeping the jacket temperature at 10° C. to obtain a composition I for an ultraviolet absorbent substance in a dispersion liquid form. The average particle diameter was 94 nm.

The obtained composition I for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance I. The thickness of the coating film was 10 μm.

Example 10

Metal complex (C5-Zn) (1.8 g) obtained in Production Example 22, 60.1 g of toluene as a dispersion medium, 21.9 g of methyl acrylate-ethyl methacrylate copolymer (product name: Paraloid B-72 manufactured by Rohm & Hass Co.) as an organic binder, and 0.68 g of polyoxyetylene lauryl ether as a dispersant were mixed, and the resulting mixture was subjected to dispersion processing at a circumferential speed of 15 m/s for 2 hours using 0.3 mm-diameter zirconia beads as dispersion media and DYNO-MILL (manufactured by Shinmaru Enterprises Corporation; Model: KDL) as a disperser while keeping the jacket temperature at 10° C. to obtain a composition J for an ultraviolet absorbent substance in a dispersion liquid form. The average particle diameter was 88 nm.

The obtained composition J for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance J. The thickness of the coating film was 12 μm.

Example 11

Methyl acrylate-ethyl methacrylate copolymer (product name: Paraloid B-72 manufactured by Rohm & Hass Co.) (21.9 g) as an organic binder was dissolved in 60.1 g of toluene. Thereto were added 2.4 g of metal complex (C6-Co) obtained in Production Example 23 and 0.68 g of polyethylene glycol dilaurate as a dispersant, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a composition K for an ultraviolet absorbent substance in a dispersion liquid form. The average particle diameter was 98 nm.

The obtained composition K for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance K. The thickness of the coating film was 13 μm.

Example 12

Methyl acrylate-ethyl methacrylate copolymer (product name: Paraloid B-72 manufactured by Rohm & Hass Co.) (21.9 g) as an organic binder was dissolved in 60.1 g of toluene. Thereto were added 3.7 g of metal complex (C8-Cu) obtained in Production Example 25 and 0.68 g of polyethylene glycol distearate as a dispersant, and the resulting mixture was subjected to dispersion processing at a circumferential speed of 15 m/s for an hour using 0.1 mm-diameter zirconia beads as dispersion media and DYNO-MILL (manufactured by Shinmaru Enterprises Corporation; Model: KDL) as a disperser while keeping the jacket temperature at 10° C. to obtain a composition L for an ultraviolet absorbent substance in a dispersion liquid form. The average particle diameter was 97 nm.

The obtained composition L for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 110° C. for 3 minutes to obtain an ultraviolet absorbent substance L. The thickness of the coating film was 10 μm.

Example 13

Metal complex (C10-Co) (2.4 g) obtained in Production Example 27, 55.0 g of cyclopentanone as a dispersion medium, 25.0 g of dipentaerythritol hexaacrylate as both a dispersion medium and a polymerizable monomer, 4.0 g of photo-polymerization initiator (product name: Irgacure 819 manufactured by Ciba Specialty Chemicals Inc.), and 0.68 g of polyoxyethylene nonylphenyl ether as a dispersant were mixed, and the resulting mixture was subjected to dispersion processing at a circumferential speed of 15 m/s for an hour using 0.3 mm-diameter zirconia beads as dispersion media and DYNO-MILL (manufactured by Shinmaru Enterprises Corporation; Model: KDL) as a disperser while keeping the jacket temperature at 20° C. to obtain a composition M for an ultraviolet absorbent substance in a dispersion liquid form. The average particle diameter was 73 nm.

The obtained composition M for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, then dried at 140° C. for a minute, exposed to light using exposure equipment (product name: Mask Aligner LA410s manufactured by Nanotec Corporation; product name: Ultra High Pressure Mercury Lamp L2501 L manufactured by SAN-EI ELECTRIC CO., LTD.) (no monochromatization; light intensity at a wavelength of 365 nm: 40 mW/cm$^2$; irradiation time: 2.5 seconds), and thus cured to obtain an ultraviolet absorbent substance M. The thickness of the coating film was 12 μm.

Example 14

In a manner similar to that in Example 13 except that 2.4 g of metal complex (C11-Ni) was used in place of 2.4 g of metal complex (C10-Co) in Example 13, a composition N for an ultraviolet absorbent substance in a dispersion liquid form was obtained. The average particle diameter was 83 nm.

The obtained composition N for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, then dried at 140° C. for a minute, exposed to light using exposure equipment (product name: Mask Aligner LA410s manufactured by Nanotec Corporation; product name: Ultra High Pressure Mercury Lamp L2501 L manufactured by SAN-EI ELECTRIC CO., LTD.) (no monochromatization; light intensity at a wavelength of 365 nm: 40 mW/cm$^2$; irradiation time: 2.5 seconds), and thus cured to obtain an ultraviolet absorbent substance N. The thickness of the coating film was 14 μm.

Example 15

Metal complex (C11-Cu) (2.2 g) obtained in Production Example 30, 28.0 g of 3,4-epoxycyclohexylmethyl-3,4-epoxycyclohexane carboxylate and 55.0 g of 3-ethyl-3-[{(3-ethyloxetanyl)methoxy}methyl]oxetane as both a dispersion medium and a polymerizable monomer, 2.5 g of thermal polymerization initiator (product name: SI-60L manufactured by SANSHIN CHEMICAL INDUSTRY Co., Ltd.), and 0.68 g of polyoxyethylene octylphenyl ether as a dispersant were mixed, and the resulting mixture was subjected to dispersion processing at a circumferential speed of 15 m/s for an hour using 0.3 mm-diameter zirconia beads as dispersion media and DYNO-MILL (manufactured by Shinmaru Enterprises Corporation; Model: KDL) as a disperser while keeping the jacket temperature at 20° C. to obtain a composition O for an ultraviolet absorbent substance in a dispersion liquid form. The average particle diameter was 95 nm.

The obtained composition O for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then cured at 160° C. for 30 minutes to obtain an ultraviolet absorbent substance O. The thickness of the coating film was 10 μm.

Example 16

In a manner similar to that in Example 15 except that 1.4 g of metal complex (C11-Zn) was used in place of 2.2 g of metal complex (C11-Cu), a composition P for an ultraviolet absorbent substance in a dispersion liquid form was obtained. The average particle diameter was 88 nm. The obtained composition P for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then cured at 160° C. for 30 minutes to obtain an ultraviolet absorbent substance P. The thickness of the coating film was 11 μm.

Example 17

DMF (0.6 g) was added to 2.0 g of siloxane oligomer/DMF solution obtained in Production Example 37, and mixed. To the solution, 0.1 g of metal complex (C2-Co) obtained in Production Example 19 was added and dissolved to thereby obtain a composition Q for an ultraviolet absorbent substance in a solution form.

The composition Q for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance Q. The thickness of the coating film was 9 μm.

Example 18

Methyl acrylate-ethyl methacrylate copolymer (product name: Paraloid B-72 manufactured by Rohm & Hass Co.) (0.8 g) as an organic binder was dissolved in 1.7 g of DMF and to the solution, 0.1 g of metal complex (C4-Cu) obtained in Production Example 21 was added and dissolved to thereby obtain a composition R for an ultraviolet absorbent substance in a solution form.

The composition R for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 160° C. for 3 minutes to obtain an ultraviolet absorbent substance R. The thickness of the coating film was 10 μm.

Example 19

DMF (0.6 g) was added to 0.1 g of metal complex (C7-Ni) obtained in Production Example 24 and dissolved. The solution was added and mixed in 2.0 g of siloxane oligomer/DMF solution obtained in Production Example 33 under stirring to thereby obtain a composition S for an ultraviolet absorbent substance in a solution form.

The composition S for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance S. The thickness of the coating film was 10 μm.

Example 20

DMF (1.7 g) was added to 0.1 g of metal complex (C9-Zn) obtained in Production Example 26 and dissolved. Thereto, 0.8 g of methyl acrylate-ethyl methacrylate copolymer (product name: Paraloid B-72 manufactured by Rohm & Hass Co.) as an organic binder was added and dissolved to thereby obtain a composition T for an ultraviolet absorbent substance in a solution form.

The composition T for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 160° C. for 3 minutes to obtain an ultraviolet absorbent substance T. The thickness of the coating film was 8 μm.

Example 21

Metal complex (C11-Co) (0.1 g) obtained in Production Example 28, 0.6 g of DMF and 2.0 g of siloxane oligomer/DMF solution obtained in Production Example 37 were placed together, and mixed/dissolved by stirring to obtain a composition U for an ultraviolet absorbent substance in a solution form.

The composition U for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance U. The thickness of the coating film was 12 µm.

Example 22

Metal complex (C12-Ni) (0.1 g) obtained in Production Example 32, 1.7 g of DMF and 0.8 g of methyl acrylate-ethyl methacrylate copolymer (product name: Paraloid B-72 manufactured by Rohm & Hass Co.) as an organic binder were placed together, and mixed/dissolved by stirring to obtain a composition V for an ultraviolet absorbent substance in a solution form.

The composition V for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 160° C. for 3 minutes to obtain an ultraviolet absorbent substance V. The thickness of the coating film was 9 µm.

Example 23

Metal complex (C13-Ni) (0.1 g) obtained in Production Example 33, 1.7 g of MEK and 0.8 g of methyl acrylate-ethyl methacrylate copolymer (product name: Paraloid B-72 manufactured by Rohm & Hass Co.) as an organic binder were placed together, and mixed/dissolved by stirring to obtain a composition W for an ultraviolet absorbent substance in a solution form.

The composition W for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 80° C. for 3 minutes to obtain an ultraviolet absorbent substance W. The thickness of the coating film was 10 µm.

Example 24

Metal complex (C14-Co) (0.1 g) obtained in Production Example 34, 1.7 g of cyclopentanone and 0.8 g of methyl acrylate-ethyl methacrylate copolymer (product name: Paraloid B-72 manufactured by Rohm & Hass Co.) as an organic binder were placed together, and mixed/dissolved by stirring to obtain a composition X for an ultraviolet absorbent substance in a solution form.

The composition X for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 80° C. for 3 minutes to obtain an ultraviolet absorbent substance X. The thickness of the coating film was 10 µm.

Comparative Example 1

IPA (0.4 g) was added to 2.0 g of siloxane oligomer/IPA solution obtained in Production Example 36, and mixed. The resulting mixture was then added to 2.0 g of zinc oxide fine particle dispersion liquid (manufactured by Hakusuitech Co., Ltd.; product name: Pazet GK-IPA Dispersion; powder primary particle diameter: 20 to 40 nm) with stirring and thus mixed to thereby obtain a composition Y for an ultraviolet absorbent substance.

The obtained composition Y for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then baked at 200° C. for 30 minutes to obtain an ultraviolet absorbent substance Y. The thickness of the coating film was 8 µm.

Comparative Example 2

Methyl acrylate-ethyl methacrylate copolymer (product name: Paraloid B-72 manufactured by Rohm & Hass Co.) (0.8 g) as an organic binder was dissolved in 1.7 g of MEK, and the resulting solution was added to 2.0 g of zinc oxide fine particle dispersion liquid (manufactured by Hakusuitech Ltd.; product name: Pazet GK-MEK Dispersion; powder primary particle diameter: 20 to 40 nm) with stirring and thus mixed to thereby obtain a composition Z for an ultraviolet absorbent substance.

The composition Z for an ultraviolet absorbent substance was coated on a soda lime glass substrate using a spin coater (manufactured by Active Co., Ltd.; Model: ACT-300A), then preliminarily dried at room temperature in a nitrogen atmosphere for 10 minutes, and then dried at 80° C. for 3 minutes to obtain an ultraviolet absorbent substance Z. The thickness of the coating film was 11 µm.

[Evaluation of Ultraviolet Absorbent Substance]

Evaluations were made in accordance with the following procedure for ultraviolet absorbent substances A to Z obtained in Examples 1 to 24 and Comparative Examples 1 and 2.

(1) Transmittance

For ultraviolet absorbent substances A to Z obtained in Examples 1 to 24 and Comparative Examples 1 and 2, the transmittance at a specified wavelength ($\lambda$=380 nm: ultraviolet ray UV-A; $\lambda$=460 nm, 545 nm, 610 nm: visible light ray) was measured using a spectrophotometer (manufactured by Hitachi, Ltd.; Model: U-4100) to make evaluations of the ultraviolet ray absorbing capability (UV-A absorbing capability) and visible light transparency.

For the measurement, specimens with a matrix layer provided on a glass substrate (no ultraviolet absorbent was contained, the types of matrixes used were same as those of samples to be measured, respectively, and specimens were prepared under same conditions) were specially prepared, and background corrections were made using the specimens as blanks. That is, it can be considered that the transmittance values shown in the table below do not imply transmission performance of the film itself, but simply derive from the ultraviolet absorbent.

(2) Light Resistance Test

After measuring the transmittance for ultraviolet absorbent substances A to Z obtained in Examples 1 to 24 and Comparative Examples 1 and 2 in accordance with procedure (1), these ultraviolet absorbent substances A to Z were irradiated with light having a radiation intensity of 60 W/m$^2$ (integration in a region of 300 to 400 nm) for 1000 hours using Xenon Weather Meter (manufactured by Suga Test Instruments Co., Ltd.; Model: X25). At this time, light was applied not from the soda lime glass substrate side of ultraviolet absorbent substances A to Z but from the coating layer side. That is, this is intended to create severer conditions for the ultraviolet absorbent by irradiating the ultraviolet absorbent in a coating layer directly with light emitted from a light source by applying light not from the soda lime glass substrate side of ultraviolet absorbent substances A to Z but from the coating layer side because soda lime glass has a nature of absorbing ultraviolet rays in a short wavelength region. For each of ultraviolet absorbent substances A to Z after irradiation of light, the transmittance was measured and a change in the ultraviolet ray absorbing capability by irradiation of light was evaluated.

The results are shown in Table 3 below.

Δ% T in the table shows a value obtained by subtracting the transmittance before irradiation of light from the transmittance after irradiation of light.

ultraviolet absorbent substance obtained in Examples 17 to 24 are all in a solution form, and ultraviolet absorbent substances Q to X prepared using these compositions Q to X for an ultraviolet absorbent substance have been confirmed to block UV-A satisfactorily and show excellent transparency in a visible region although their light resistance is in general slightly low in comparison with the dispersion systems.

Comparative Examples 1 and 2 are systems in which zinc oxide fine particles which have been known are used as an

TABLE 3

| | | Transmittance (% T) | | | | | | | | | | | |
|---|---|---|---|---|---|---|---|---|---|---|---|---|---|
| Evaluation of Ultraviolet Absorbent Substance | | Ultraviolet region (UV-A) | | | Visible light region | | | | | | | | |
| | | λ = 380 nm | | | λ = 460 nm | | | λ = 545 nm | | | λ = 610 nm | | |
| | | Before irradiation of light | After irradiation of light | Δ % T | Before irradiation of light | After irradiation of light | Δ % T | Before irradiation of light | After irradiation of light | Δ % T | Before irradiation of light | After irradiation of light | Δ % T |
| Example 1 | A | 2.0 | 2.5 | 0.5 | 99.8 | 99.9 | 0.1 | 99.9 | 99.9 | 0.1 | 99.9 | 99.9 | 0 |
| Example 2 | B | 1.9 | 2.3 | 0.4 | 99.8 | 99.9 | 0 | 99.7 | 99.9 | 0.2 | 99.9 | 100 | 0.1 |
| Example 3 | C | 1.8 | 2.3 | 0.5 | 99.5 | 99.7 | 0.2 | 99.8 | 99.9 | 0.1 | 99.9 | 99.9 | 0 |
| Example 4 | D | 1.5 | 5.5 | 4.0 | 100 | 100 | 0 | 100 | 100 | 0 | 100 | 100 | 0 |
| Example 5 | E | 1.8 | 2.4 | 0.6 | 99.8 | 99.8 | 0 | 99.9 | 99.9 | 0 | 100 | 100 | 0 |
| Example 6 | F | 2.0 | 2.5 | 0.5 | 100 | 100 | 0 | 100 | 100 | 0 | 100 | 100 | 0 |
| Example 7 | G | 2.3 | 2.9 | 0.6 | 99.4 | 99.6 | 0.2 | 99.9 | 99.9 | 0 | 99.9 | 99.9 | 0 |
| Example 8 | H | 2.5 | 6.2 | 3.7 | 100 | 100 | 0 | 100 | 100 | 0 | 100 | 100 | 0 |
| Example 9 | I | 2.2 | 2.9 | 0.6 | 99.8 | 99.9 | 0.1 | 100 | 100 | 0 | 100 | 100 | 0 |
| Example 10 | J | 1.8 | 5.4 | 3.6 | 100 | 100 | 0 | 100 | 100 | 0 | 100 | 100 | 0 |
| Example 11 | K | 2.4 | 3.0 | 0.6 | 100 | 100 | 0 | 100 | 100 | 0 | 100 | 100 | 0 |
| Example 12 | L | 2.6 | 3.1 | 0.5 | 99.4 | 99.7 | 0.4 | 99.9 | 100 | 0.1 | 99.9 | 100 | 0.1 |
| Example 13 | M | 2.3 | 2.7 | 0.4 | 100 | 100 | 0 | 100 | 100 | 0 | 100 | 100 | 0 |
| Example 14 | N | 1.8 | 2.2 | 0.4 | 99.8 | 99.9 | 0.1 | 100 | 100 | 0 | 100 | 100 | 0 |
| Example 15 | O | 2.0 | 2.4 | 0.4 | 99.5 | 99.8 | 0.3 | 99.8 | 99.9 | 0.2 | 99.9 | 99.9 | 0 |
| Example 16 | P | 1.8 | 4.8 | 3.0 | 100 | 100 | 0 | 100 | 100 | 0 | 100 | 100 | 0 |
| Example 17 | Q | 1.7 | 3.9 | 2.2 | 100 | 100 | 0 | 100 | 100 | 0 | 100 | 100 | 0 |
| Example 18 | R | 2.0 | 4.1 | 2.1 | 99.9 | 100 | 0.1 | 99.8 | 100 | 0.2 | 100 | 100 | 0 |
| Example 19 | S | 2.4 | 4.2 | 1.8 | 100 | 100 | 0 | 100 | 100 | 0 | 100 | 100 | 0 |
| Example 20 | T | 1.8 | 3.8 | 2.0 | 100 | 100 | 0 | 100 | 100 | 0 | 100 | 100 | 0 |
| Example 21 | U | 2.5 | 4.4 | 1.9 | 100 | 100 | 0 | 100 | 100 | 0 | 100 | 100 | 0 |
| Example 22 | V | 2.3 | 4.3 | 2.0 | 100 | 100 | 0 | 100 | 100 | 0 | 100 | 100 | 0 |
| Example 23 | W | 2.3 | 4.5 | 2.2 | 100 | 100 | 0 | 100 | 100 | 0 | 100 | 100 | 0 |
| Example 24 | X | 2.2 | 4.1 | 1.9 | 100 | 100 | 0 | 100 | 100 | 0 | 100 | 100 | 0 |
| Comparative Example 1 | Y | 60.5 | 60.7 | 0.2 | 94.7 | 94.8 | 0.1 | 92.4 | 92.5 | 0.1 | 98.8 | 98.9 | 0.1 |
| Comparative Example 2 | Z | 63.9 | 64.2 | 0.3 | 95.2 | 95.3 | 0.1 | 95.1 | 95.3 | 0.2 | 99.3 | 99.3 | 0 |

Examples 1 to 16 are systems in which a metal complex represented by formula (1) is used as an ultraviolet absorbent in a form of fine particles in a dispersion system. That is, compositions A to P for an ultraviolet absorbent substance obtained in Examples 1 to 16 are all in a dispersion liquid form, and ultraviolet absorbent substances A to P prepared using these compositions A to P for an ultraviolet absorbent substance have been confirmed to block UV-A satisfactorily, also have only a small change in transmittance by irradiation of light, and show excellent light resistance.

Examples 4, 8, 10 and 16 (ultraviolet absorbent substances D, H, J and P, respectively) are systems in which a metal complex where M in formula (1) is a zinc atom is used, and could be confirmed to have quite excellent transparency in a visible region although their light resistance is low in comparison with systems in which a metal complex where M in formula (1) is a cobalt, nickel or copper atom is used.

Examples 17 to 24 are systems in which a metal complex represented by formula (1) is used as an ultraviolet absorbent in a dissolution system. That is, compositions Q to X for an ultraviolet absorbent. It has been confirmed that they have very good light resistance, but cannot block UV-A satisfactorily.

INDUSTRIAL APPLICABILITY

A composition for an ultraviolet absorbent substance of the present invention and an ultraviolet absorbent substance prepared using the composition can keep excellent light resistance for a long period and can satisfactorily block UV-A which has been difficult to block heretofore while maintaining the transmittance of visible light at a high level.

The invention claimed is:

1. A composition for an ultraviolet absorbent substance which comprises at least one metal complex represented by formula (1) and at least one matrix material and/or polymerizable monomer as a precursor of a matrix material:

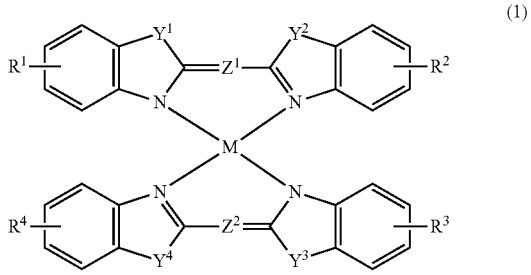 (1)

wherein $Y^1$, $Y^2$, $Y^3$ and $Y^4$ are each, independently of one another, NH, $NR^5$, an oxygen atom or a sulfur atom, and $R^5$ of $NR^5$ assigned to $Y^1$, $Y^2$, $Y^3$ or $Y^4$ is an alkyl group having 1 to 8 carbon atoms or an aryl group having 6 to 15 carbon atoms, which may have substituent(s), with proviso that $Z^1$ and $Z^2$ are each, independently of one another, a nitrogen atom or $CR^6$;

$R^6$ of $CR^6$ assigned to $Z^1$ or $Z^2$ represents an alkyl group having 1 to 8 carbon atoms, which may have substituent(s), when $Y^1$, $Y^2$, $Y^3$ or $Y^4$ are not all oxygen atoms, or an alkyl group having 2 to 8 carbon atoms, which may have substitute(s), when all of $Y^1$, $Y^2$, $Y^3$ or $Y^4$ are oxygen atoms; an aryl group having 6 to 15 carbon atoms, which may have substituent(s); a heteroaryl group having 4 to 12 carbon atoms, which may have substituent(s); a heteroaralkyl group having 5 to 12 carbon atoms, which may have substituent(s); or an aralkyl group having 7 to 15 carbon atoms, provided that when $Z^1$ and $Z^2$ are both represented by $CR^6$, these occurrences of $R^6$ of $CR^6$ each represent a substituent which is independent of each other; and each of $R^1$, $R^2$, $R^3$ and $R^4$ is absent or, if present, one to four of 4 hydrogen atoms bound to 4 carbon atoms other than 2 carbon atoms shared with a five-membered ring among 6 carbon atoms of one benzene ring can be substituted, and all of substituents substituting for hydrogen atom(s) of the four benzene rings are each, independently of one another, an alkyl group having 1 to 8 carbon atoms, which may have substituent(s), a hydroxyl group, a carboxyl group, an alkoxy group having 1 to 4 carbon atoms, a halogeno group, an alkylaminosulfonyl group having 1 to 8 carbon atoms, which may have substituent(s), a morpholinosulfonyl group which may have substituent(s), a piperidinosulfonyl group which may have substituent(s), a pyrrolidinosulfonyl group which may have substituent(s), a thiomorpholinosulfonyl group which may have substituent(s) or a piperazinosulfonyl group which may have substituent(s), and M represents a metal atom.

2. The composition for an ultraviolet absorbent substance according to claim 1, wherein the metal atom M in formula (1) is a cobalt atom, a nickel atom, a copper atom or a zinc atom.

3. The composition for an ultraviolet absorbent substance according to claim 2, which is in a solution form wherein a solvent is included, or no solvent is included and the precursor of a matrix material also serves as a solvent.

4. The composition for an ultraviolet absorbent substance according to claim 2, which is in a dispersion liquid form wherein a dispersion medium is included, or no dispersion medium is included and the precursor of a matrix material also serves as a dispersion medium, and fine particles of the metal complex are dispersed.

5. An ultraviolet absorbent substance comprising the composition for an ultraviolet absorbent substance according to claim 2.

6. The ultraviolet absorbent substance according to claim 5, which is an ultraviolet absorbent substance as a laminate having on a substrate a film of a matrix material containing the metal complex.

7. The ultraviolet absorbent substance according to claim 5, which is an ultraviolet absorbent substance in a thin film form wherein the metal complex is contained in a film of a matrix material.

8. The composition for an ultraviolet absorbent substance according to claim 1, which is in a solution form wherein a solvent is included, or no solvent is included and the precursor of a matrix material also serves as a solvent.

9. An ultraviolet absorbent substance comprising the composition for an ultraviolet absorbent substance according to claim 8.

10. The ultraviolet absorbent substance according to claim 9, which is an ultraviolet absorbent substance as a laminate having on a substrate a film of a matrix material containing the metal complex.

11. The ultraviolet absorbent substance according to claim 9, which is an ultraviolet absorbent substance in a thin film form wherein the metal complex is contained in a film of a matrix material.

12. The composition for an ultraviolet absorbent substance according to claim 1, which is in a dispersion liquid form wherein a dispersion medium is included, or no dispersion medium is included and the precursor of a matrix material also serves as a dispersion medium, and fine particles of the metal complex are dispersed.

13. An ultraviolet absorbent substance comprising the composition for an ultraviolet absorbent substance according to claim 12.

14. The ultraviolet absorbent substance according to claim 13, which is an ultraviolet absorbent substance as a laminate having on a substrate a film of a matrix material containing the metal complex.

15. The ultraviolet absorbent substance according to claim 13, which is an ultraviolet absorbent substance in a thin film form wherein the metal complex is contained in a film of a matrix material.

16. An ultraviolet absorbent substance comprising the composition for an ultraviolet absorbent substance according to claim 1.

17. The ultraviolet absorbent substance according to claim 16, which is an ultraviolet absorbent substance as a laminate having on a substrate a film of a matrix material containing the metal complex.

18. The ultraviolet absorbent substance according to claim 16, which is an ultraviolet absorbent substance in a thin film form wherein the metal complex is contained in a film of a matrix material.

* * * * *